US012387707B2

(12) United States Patent
Yanagisawa

(10) Patent No.: US 12,387,707 B2
(45) Date of Patent: Aug. 12, 2025

(54) PROJECTOR, COOLING APPARATUS, AND CONTROL METHOD

(71) Applicant: SEIKO EPSON CORPORATION, Tokyo (JP)

(72) Inventor: Yoshiyuki Yanagisawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 561 days.

(21) Appl. No.: 17/889,582

(22) Filed: Aug. 17, 2022

(65) Prior Publication Data

US 2023/0058869 A1 Feb. 23, 2023

(30) Foreign Application Priority Data

Aug. 18, 2021 (JP) .................. 2021-133628

(51) Int. Cl.
*G03B 21/16* (2006.01)
*G06F 1/20* (2006.01)
*G10K 11/178* (2006.01)
*H04R 1/02* (2006.01)

(52) U.S. Cl.
CPC ........ *G10K 11/17823* (2018.01); *G03B 21/16* (2013.01); *G06F 1/206* (2013.01); *G10K 11/17873* (2018.01); *H04R 1/028* (2013.01); *G10K 2210/109* (2013.01);
(Continued)

(58) Field of Classification Search
CPC ........ G03B 21/14; G03B 21/16; G03B 21/18; G03B 21/20; G03B 21/145; G03B 21/202; G03B 21/2026; G03B 21/2033;
G10K 11/17823; G10K 11/17825; G10K 11/17853; G10K 11/17873; G10K 11/17883; G06F 1/20; G06F 1/203; G06F 1/206; H04R 1/00; H04R 1/023;
(Continued)

(56) References Cited

U.S. PATENT DOCUMENTS

| 5,995,632 A | 11/1999 | Okada |
| 11,151,978 B1 * | 10/2021 | Tseng .................. G10K 11/161 |
| 2005/0094823 A1 | 5/2005 | Kobori et al. |

(Continued)

FOREIGN PATENT DOCUMENTS

| JP | H10-020866 A | 1/1998 |
| JP | 2005-133588 A | 5/2005 |

*Primary Examiner* — Sultan Chowdhury
(74) *Attorney, Agent, or Firm* — Oliff PLC

(57) ABSTRACT

A projector includes an exterior enclosure having an intake port and a discharge port, a heat source, a fan that causes a cooling gas to flow to the heat source, a loudspeaker that is disposed between one of the two openings, and the fan in the channel of the cooling gas and outputs a sound wave according to a drive signal inputted to the loudspeaker, a characteristic data storage section that stores frequency characteristic data on the frequency characteristics of discrete frequency noise, broadband noise, and in-apparatus environmental noise, and a control section that generates the drive signal, and the control section includes a characteristic acquisition section that acquires the frequency characteristic data corresponding to the rotational speed of the fan per unit time, a waveform generation section that generates the waveform of an interference sound, and a signal output section that outputs the drive signal.

19 Claims, 11 Drawing Sheets

(52) U.S. Cl.
CPC ............... *G10K 2210/3027* (2013.01); *G10K 2210/3044* (2013.01); *H04R 2499/15* (2013.01)

(58) Field of Classification Search
CPC .... H04R 1/028; H04N 9/3141; H04N 9/3144; H04N 9/3194
See application file for complete search history.

(56) References Cited

U.S. PATENT DOCUMENTS

2010/0097151 A1\* 4/2010 Arai .................. H03F 3/24
    331/25
2020/0310232 A1\* 10/2020 Miura ................. F04D 27/004

\* cited by examiner

PROJECTOR, COOLING APPARATUS, AND CONTROL METHOD

The present application is based on, and claims priority from JP Application Serial Number 2021-133628, filed Aug. 18, 2021, the disclosure of which is hereby incorporated by reference herein in its entirety.

BACKGROUND

1. Technical Field

The present disclosure relates to a projector, a cooling apparatus, and a control method.

2. Related Art

There is a known muffling apparatus of related art that reduces noise produced by a driven fan (see JP-A-2005-133588 and JP-A-10-20866, for example).

The muffling apparatus described in JP-A-2005-133588 includes two fans, a microphone, a loudspeaker, a rotational speed detection section, a frequency measurement section, a frequency analysis section, a rotation number counting section, a time-division control permission section, a lookup table, an f value determination section, an amplification and phase control section, and a waveform generation section.

Out of the components described above, the microphone monitors the noise situation in a duct structure where airflow is generated by the rotational motion of the fans. The rotational speed detection section generates one-pulse rotation signal as information on the rotation of the two fans, and the frequency measurement section measures the frequency of the rotation of the fans from the one-pulse rotation signal and outputs information on the frequency. The rotation number counting section generates a reference for the frequency of the rotation of each of the fans with respect to the information on the frequency, a reference of the phase of the waveform of the muffled noise, and a time-division timing signal with respect to the count of the rotation number of each of the fans. The time-division control permission section issues a signal indicating control permission or non-permission for each component of the noise from each of the fans with respect to the time-division timing signal. The lookup table holds a variety of frequency characteristics of the structure, the environment, the loudspeaker, and the microphone. The f value determination section determines a fundamental frequency and a secondary component of the noise determined from the information on the frequency outputted by the frequency measurement section and the number of vanes of the fans.

The amplification and phase control section controls the amplitude and the amount of shift of the phase of the waveform of the muffled noise to minimize the amount of residual noise based on the result of evaluation of the muffled noise condition during the period for which the time-division control permission signal shows a permission period for each component of the noise from each of the fans, and generates the amplitude and the amount of phase shift to which the amount of amplification correction and the amount of phase correction in the look-up table have been added. On the other hand, during the period for which the time-division control permission signal shows a non-permission period, the amplification and phase control section holds the amplitude and the amount of phase shift determined in the past permission period.

The waveform generation section generates a waveform opposite in terms of phase from the waveform of each component of the noise from each of the fans based on the frequency, the rotational phase reference, the amplitude, and the amount of shift of the phase of each of four components of each of the fans to be muffled by the f-value determination section.

The opposite-phase waveforms of the four components are summed up, and the summed waveform is then converted into an analog signal, from which unwanted frequency components and noise are removed. The resultant signal is amplified and then outputted to the loudspeaker.

The muffling apparatus described in JP-A-2005-133588, however, uses a microphone. When the muffling apparatus includes a microphone, the cost of the microphone is added to the manufacturing cost of the muffling apparatus, resulting in a problem of not only an increase in the manufacturing cost of the muffling apparatus, but also an increase in the size of the muffling apparatus.

To address the problems described above, the muffling apparatus described in JP-A-10-20866 generates the waveform of the muffled noise without using a microphone. Specifically, the muffling apparatus described in JP-A-10-20866 includes a fan, a rotation information detector, a bandpass filter, an output adjuster, and a muffling loudspeaker.

The rotation information detector detects fan rotation information including the fundamental frequency of the noise produced when the fan rotates. The rotation information detector includes a photo-interrupter and a rotating disc that rotates in conjunction with the fan to transmit/block the light from the photo-interrupter, and a signal detection section outputs a signal primarily formed of a frequency equal to the product of the "rotational speed per second" and the "number of vanes". The bandpass filter extracts the fundamental wave of the noise based on the fan rotation information. The output adjuster adjusts the amplitude and phase of a signal representing the extracted fundamental wave of the noise. The muffling loudspeaker converts an electric signal according to the signal representing the fundamental wave outputted from the output adjuster into an audio signal and outputs the audio signal.

The noise of the fan is thus reduced.

The noise muffled by the muffling apparatus described in JP-A-10-20866, however, is discrete frequency noise produced as a result of the rotation of the fan, and therefore has a problem of a narrower range over which the noise can be reduced than that of the muffling apparatus described in JP-A-2005-133588.

It has therefore been desired to simplify the configuration of the muffling apparatus and expand the range over which the noise can be reduced.

SUMMARY

A projector according to an aspect of the present disclosure includes an exterior enclosure having an intake port and a discharge port, a heat source disposed in the exterior enclosure, a fan that causes a cooling gas to flow to the heat source, a loudspeaker that is disposed between one of two openings, the intake port and the discharge port, and the fan in a channel of the cooling gas and outputs a sound wave according to a drive signal inputted to the loudspeaker, a characteristic data storage section that stores frequency characteristic data on frequency characteristics of first noise containing discrete frequency noise produced by the driven fan, broadband noise based on a flow of the cooling gas generated by the driven fan, and in-apparatus environmental noise in accordance with a rotational speed of the fan per unit time, and a control section that generates the drive signal to be outputted to the loudspeaker.

The control section includes a characteristic acquisition section that acquires the frequency characteristic data corresponding to the rotational speed of the fan per unit time from the characteristic data storage section, a waveform generation section that generates a waveform of an interference sound that interferes with the first noise leaking out of the exterior enclosure via the one opening based on the frequency characteristic data acquired by the characteristic acquisition section, and a signal output section that outputs the drive signal based on the waveform generated by the waveform generation section to the loudspeaker.

A cooling apparatus according to another aspect of the present disclosure includes a fan that causes a cooling gas to flow to a heat source, a loudspeaker that outputs a sound wave according to a drive signal inputted to the loudspeaker, a characteristic data storage section that stores frequency characteristic data on frequency characteristics of first noise containing discrete frequency noise produced by the driven fan, broadband noise based on a flow of the cooling gas generated by the driven fan, and environmental noise in accordance with a rotational speed of the fan per unit time, and a control section that generates the drive signal to be outputted to the loudspeaker.

The control section includes a characteristic acquisition section that acquires the frequency characteristic data corresponding to the rotational speed of the fan per unit time from the characteristic data storage section, a waveform generation section that generates a waveform of an interference sound that reduces the first noise based on the frequency characteristic data acquired by the characteristic acquisition section, and a signal output section that outputs the drive signal based on the waveform generated by the waveform generation section to the loudspeaker.

A control method according to another aspect of the present disclosure is a control method executed by an electronic instrument including a fan that causes a cooling gas to flow to a heat source and a loudspeaker that outputs a sound wave according to a drive signal inputted to the loudspeaker.

The method includes acquiring frequency characteristic data on frequency characteristics of first noise containing discrete frequency noise produced by the driven fan, broadband noise based on a flow of the cooling gas generated by the driven fan, and in-apparatus environmental noise in accordance with a rotational speed of the fan per unit time, generating a waveform of interference sound that interferes with the first noise leaking out of the electronic instrument based on the acquired frequency characteristic data, and outputting the drive signal based on the generated waveform of the interference sound to the loudspeaker.

DESCRIPTION OF EXEMPLARY EMBODIMENTS

First Embodiment

Figure 1:
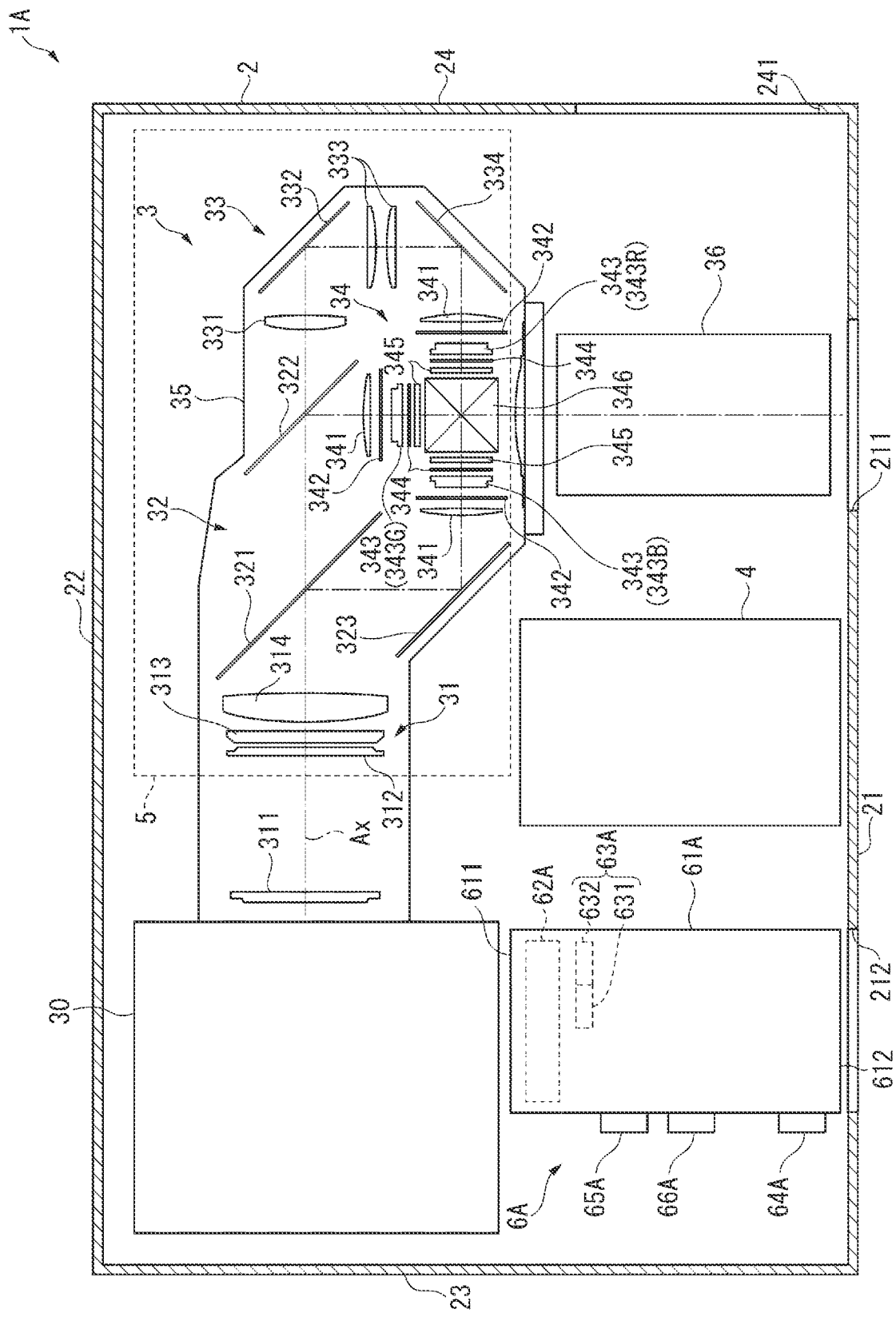
FIG. 1 is a diagrammatic view showing the configuration of a projector according to a first embodiment.

A first embodiment of the present disclosure will be described below with reference to the drawings.
Schematic Configuration of Projector FIG. 1 is a diagrammatic view showing the configuration of a projector 1A according to the present embodiment.

The projector 1A according to the present embodiment modulates light outputted from a light source to form an image according to image information and enlarges and projects the formed image on a projection receiving surface, such as a screen, and the projector 1A corresponds to an electronic apparatus. The projector 1A includes an exterior enclosure 2, an image projection apparatus 3, a power supply apparatus 4, a control apparatus 5, and a cooling apparatus 6A, as shown in FIG. 1.

Each component of the projector 1A will be described below.
Configuration of Power Supply Apparatus and Control Apparatus The power supply apparatus 4 and the control apparatus 5 will first be described.

The power supply apparatus 4 transforms electric power supplied from a component outside the projector 1A and supplies the transformed electric power to electronic parts that form the projector 1A.

The control apparatus 5 includes a control circuit, for example, a CPU (central processing unit) and controls the operation of the projector 1A. The control apparatus 5, for example, controls the operation of turning on and off a light source 30, which will be described below, and causes light modulators 343 to form images according to image information received from an external component.

Furthermore, the control apparatus 5, for example, outputs control signals to the cooling apparatus 6A to control the operation of cooling targets cooled by the cooling apparatus 6A and reduce noise leaking out of the exterior enclosure 2.

The power supply apparatus 4 and the control apparatus 5 are heat sources.
Configuration of Exterior Enclosure The exterior enclosure 2 forms the exterior of the projector 1A and accommodates the image projection apparatus 3, the power supply apparatus 4, the control apparatus 5, and the cooling apparatus 6A.

The exterior enclosure 2 has a front surface section 21, a rear surface section 22, a left side surface section 23, and a right side surface section 24. Although not shown, the exterior enclosure 2 includes a top surface section to which one-side ends of the surface sections 21 to 24 are coupled and a bottom surface section to which the other-side ends of the surface sections 21 to 24 are coupled. The exterior enclosure 2 is formed, for example, in a substantially box-like shape.

The right side surface section 24 has an intake port 241. The intake port 241 introduces the air outside the exterior enclosure 2 into the exterior enclosure 2. The intake port 241 may be provided with a filter that traps dust contained in the air passing through the intake port 241.

The front surface section 21 has a passage port 211 located substantially at the center of the front surface section 21. Light projected from a projection optical apparatus 36, which will be described later, passes through the passage port 211.

The front surface section 21 has a discharge port 212 located in the front surface section 21 in a position shifted toward the left side surface section 23.

Air having cooled the cooling targets provided in the exterior enclosure 2 is discharged out of the exterior enclosure 2 via the discharge port 212.

The intake port may be provided in a surface of the exterior enclosure 2 other than the right side surface section 24, and the discharge port may be provided in a surface of the exterior enclosure 2 other than the front surface section 21.

In the following description, three directions perpendicular to one another are called directions +X, +Y, and +Z. It is assumed that the direction +X is the direction from the left side surface section 23 toward the right side surface section 24, the direction +Y is the direction from the bottom surface section toward the top surface section, and the direction +Z is the direction from the rear surface section 22 toward the front surface section 21.

Although not illustrated, the direction opposite the direction +X is called a direction −X, the direction opposite the direction +Y is called a direction −Y, and the direction opposite the direction +Z is called a direction −Z. The direction +Z is the direction in which the projection optical apparatus 36, which will be described later, projects light when viewed along the direction +Y.

Configuration of Image Projection Apparatus

The image projection apparatus 3 forms an image according to image information inputted from the cooling apparatus 5 and projects the formed image. The image projection apparatus 3 includes a light source apparatus 30, a light homogenization section 31, a color separation section 32, a relay section 33, an image formation section 34, an optical part enclosure 35, and the projection optical apparatus 36.

The light source 30 outputs light. Although not shown, the light source 30 can employ a configuration including a solid-state light source such as an LD (laser diode) and LED (light emitting diode), or a configuration including a discharge light source lamp such as an ultrahigh-pressure mercury lamp. The light source 30 is a heat source.

The light homogenization section 31 homogenizes the light outputted from the light source 30. The homogenized light travels via the color separation section 32 and the relay section 33 and illuminates a modulation region of each of the light modulators 343, which will be described later, of the image formation section 34. The light homogenization section 31 includes two lens arrays 311 and 312, a polarization conversion element 313, and a superimposing lens 314.

The color separation section 32 separates the light incident from the light homogenization section 31 into red light, green light, and blue light. The color separation section 32 includes two dichroic mirrors 321 and 322 and a reflection mirror 323, which reflects the separated blue light from the dichroic mirror 321.

The relay section 33 is provided in the optical path of the red light, which is longer than the optical paths of the other color light, and suppresses loss of the red light. The relay section 33 includes a light-incident-side lens 331, relay lenses 333, reflection mirrors 332 and 334. In the present embodiment, the relay section 33 is provided in the optical path of the red light, but not necessarily. For example, the blue light may be configured to have an optical path longer than those of the other color light, and the relay section 33 may be provided in the optical path of the blue light.

The image formation section 34 modulates the red light, the green light, and the blue light incident thereon and combines the modulated red light, green light, and blue light with one another to form an image. The image formation section 34 includes three field lenses 341, three light-incident-side polarizers 342, three light modulators 343, three viewing angle compensators 344, and three light-exiting-side polarizers 345, which are provided in accordance with the incident color light, and one light combining section 346.

The light modulators 343 modulate the light outputted from the light source 30 in accordance with the image information. The light modulators 343 include a light modulator 343R for the red light, a light modulator 343G for the green light, and a light modulator 343B for the blue light. In the present embodiment, the light modulators 343 are each formed of a transmissive liquid crystal panel, and the light-incident-side polarizers 342, the light modulators 343, and the light-exiting-side polarizers 345 form liquid crystal light valves. The liquid crystal light valves are heat sources that generate heat when light is incident thereon from the light source 30. The image formation section 34, which includes the liquid crystal light valves, is therefore a heat source.

The light combining section 346 combines the blue light modulated by the light modulator 343B, the green light modulated by the light modulator 343G, and the red light modulated by the light modulator 343R with one another to form an image. In the present embodiment, the light combining section 346 is formed of a cross dichroic prism, but not necessarily, and can instead be formed, for example, of a plurality of dichroic mirrors.

The optical part enclosure 35 accommodates the sections 31 to 34 described above. An illumination optical axis Ax, which is the optical axis in the design stage, is set in the image projection apparatus 3, and the optical part enclosure 35 holds the sections 31 to 34 in predetermined positions on the illumination optical axis Ax. The light source 30 and the projection optical apparatus 36 are disposed in predetermined positions on the illumination optical axis Ax.

The projection optical apparatus 36 is a projection lens that enlarges and projects the image incident from the image formation section 34 on the projection receiving surface. That is, the projection optical apparatus 36 projects the light modulated by the light modulators 343B, 343G, and 343R. The projection optical apparatus 36 is configured, for example, as a lens assembly formed of a plurality of lenses accommodated in a tubular lens barrel.

Configuration of Cooling Apparatus

The cooling apparatus 6A has the function of cooling the cooling targets that form the projector 1A and the function of reducing noise leaking out of the exterior enclosure 2. The cooling apparatus 6A includes a duct 61A, a fan 62A, a detection section 63A, a loudspeaker 64A, a storage section 65A, and a control section 66A.

Configuration of Duct

The duct 61A is a tubular element extending along the direction +Z and includes an introduction port 611 and an exit port 612. The duct 61A is configured to allow a cooling gas to flow through the interior of the duct 61A from the introduction port 611 toward the exit port 612. That is, the duct 61A has an inner channel through which the cooling gas can flow. The duct 61A causes a space in the vicinity of the light source 30, which is a heat source, to communicate with the discharge port 212, and guides the cooling gas having cooled the light source 30 to the exit port discharge. The inner surface of the duct 61A may be provided with a sound-absorbing material.

The introduction port 611 is provided at the −Z-direction-side end of the duct 61A. The introduction port 611 is an opening through which the cooling gas is introduced into the duct 61A.

The exit port 612 is provided at the +Z-direction-side end of the duct 61A. That is, the exit port 612 is provided on the side of the duct 61A opposite from the introduction port 611. The exit port 612 is an opening through which the cooling gas introduced into the duct 61A is discharged out of the duct 61A. The cooling gas discharged via the exit port 612 is discharged out of the exterior enclosure 2 via the discharge port 212.

Configuration of Fan

The fan 62A is provided in the duct 61A. In detail, the fan 62A is disposed in the duct 61A in a position shifted from the loudspeaker 64A toward the introduction port 611. The fan 62A sucks the cooling gas in the exterior enclosure 2 to cause the cooling gas to flow to the light source 30 and also introduces the cooling gas having cooled the light source 30 into the duct 61A via the introduction port 611. The fan 62A then sends the cooling gas introduced into the duct 61A in the direction +Z and discharges the cooling gas out of the exterior enclosure 2 via the exit port 612 and the discharge port 212. In the present embodiment, the fan 62A is an axial fan and may instead be a centrifugal fan.

Configuration of Detection Section

The detection section 63A detects the state of the rotation of the fan 62A. The detection section 63A includes a rotational speed detection section 631 and a rotational position detection section 632.

The rotational speed detection section 631 detects the rotational speed of the fan 62A per unit time. The rotational speed per unit time is hereinafter referred in some cases to as a fan rotational speed.

The rotational position detection section 632 detects the rotational position of the fan 62A. Specifically, the rotational position detection section 632 detects the position of a target vane with respect to the reference position, the target vane being one of a plurality of vanes (not shown) of the fan 62A. In detail, the rotational position detection section 632 detects the angle of rotation of the target vane provided that the angle of the target vane is 0° when the target vane is located in the reference position.

The detection section 63A outputs to the control section 66A the rotational speed of the fan 62A per unit time detected by the rotational speed detection section 631 and the rotational position of the fan 62A detected by the rotational position detection section 632.

Configuration of Loudspeaker

The loudspeaker 64A is provided in the duct 61A and outputs a sound wave according to a drive signal inputted from the control section 66A, which will be described later. Specifically, the loudspeaker 64A is disposed between the discharge port 212 and the fan 62A in the channel of the cooling gas and outputs an interference sound that is the sound wave according to the inputted drive signal. The interference sound emitted by the loudspeaker 64A is hereafter referred to as a discharge-side interference sound.

The discharge-side interference sound is a sound wave that interferes with discharge-side noise that propagates in the duct 61A and leaks out of the exterior enclosure 2 via the discharge port 212 to reduce the discharge-side noise. That is, the discharge-side interference sound is a sound wave opposite in terms of phase from the discharge-side noise, and when the discharge-side interference sound interferes with the discharge-side noise in the duct 61A, the sound pressure of the discharge-side noise leaking out of the exterior enclosure 2 decreases. The discharge-side noise corresponds to first noise.

The detail of the drive signal inputted to the loudspeaker 64A will be described later.

Configuration of Storage Section

Figure 2:
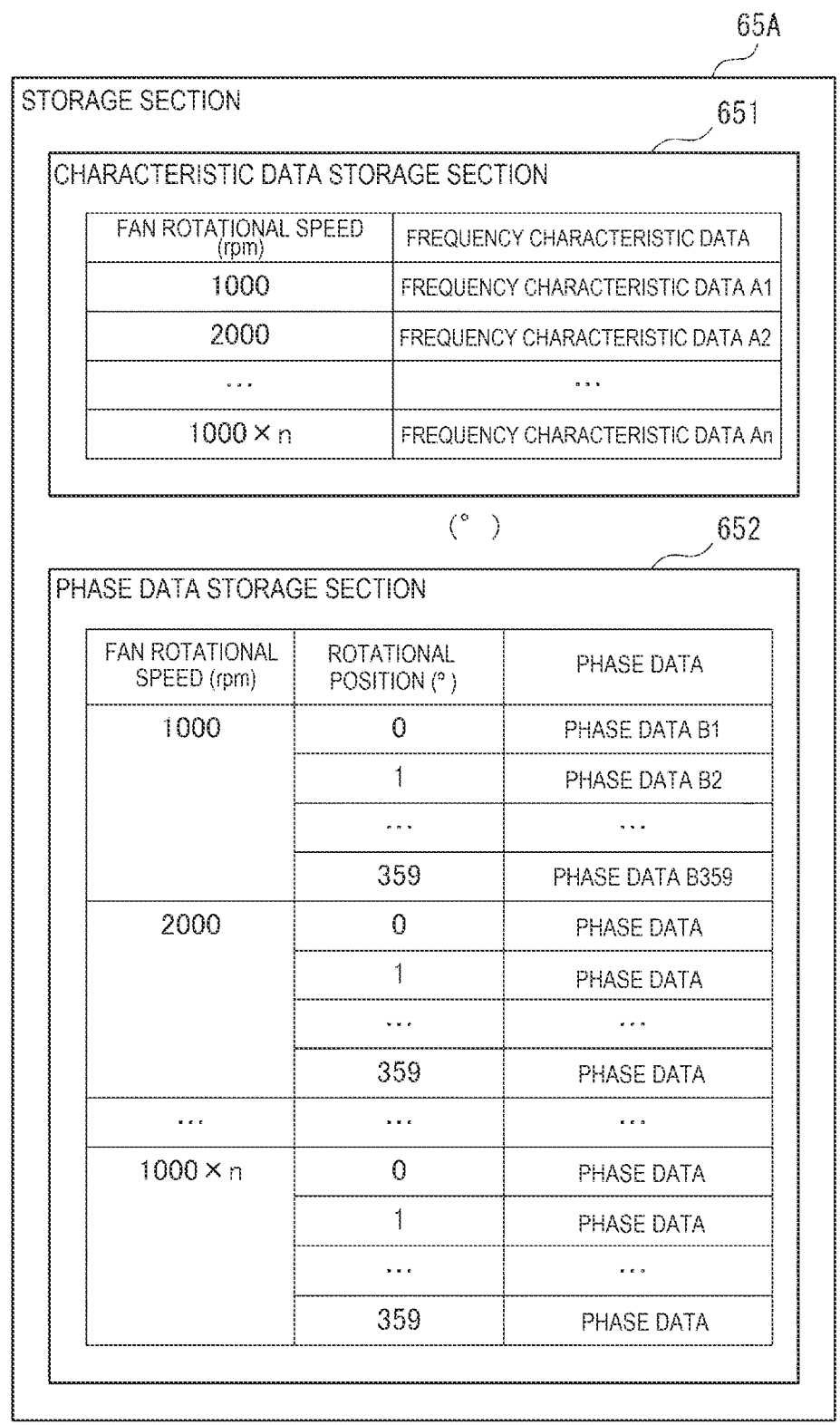
FIG. 2 is a diagrammatic view showing the content stored in a storage section according to the first embodiment.

FIG. 2 is a diagrammatic view showing the content stored in the storage section 65A.

The storage section 65A stores data necessary for the function of the cooling apparatus 6A. For example, the storage section 65A stores fan voltages to be applied to the fan 62A to rotate the fan 62A at predetermined fan rotational speeds.

The storage section 65A includes a characteristic data storage section 651 and a phase data storage section 652, as shown in FIG. 2.

Configuration of Characteristic Data Storage Section

Figure 3:
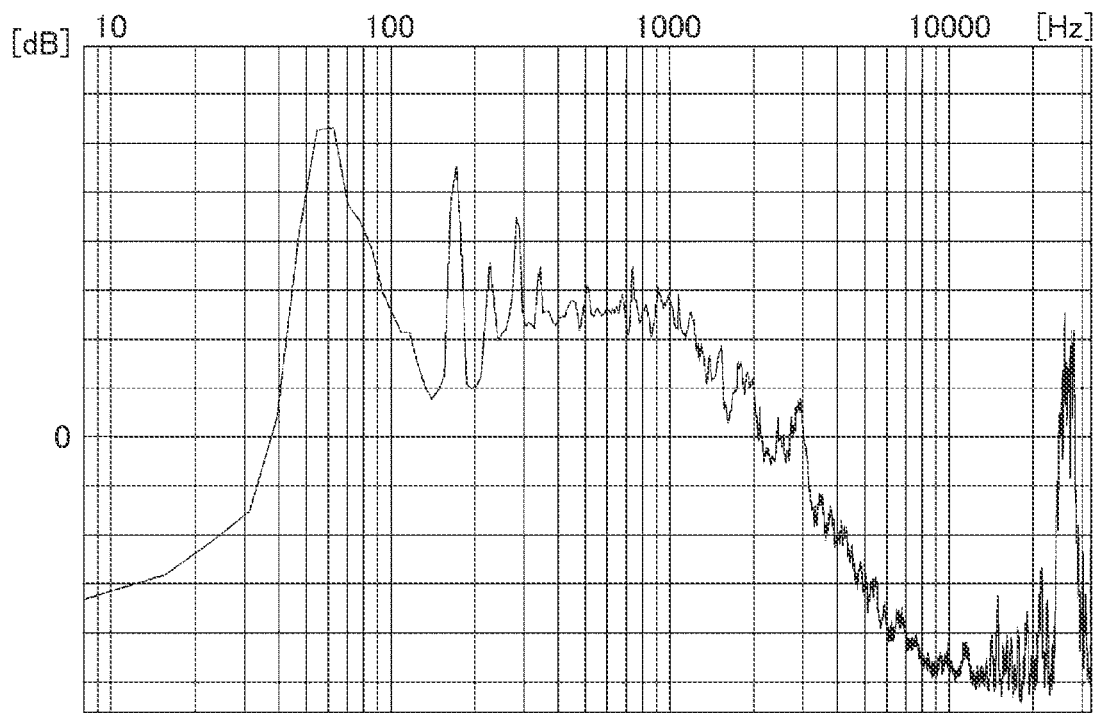
FIG. 3 is a graph showing the result of frequency analysis of discharge-side noise according to the first embodiment.

FIG. 3 is a graph showing the result of frequency analysis of the discharge-side noise produced by the fan 62A driven at a predetermined fan rotational speed. In detail, FIG. 3 is a graph showing the sound pressures of a plurality of frequency components contained in the discharge-side noise.

When the fan rotational speed of fan 62A is a predetermined rotational speed, the discharge-side noise leaking out of the exterior enclosure 2 via the discharge port 212 contains discrete frequency noise, broadband noise, and in-apparatus environmental noise, as shown in FIG. 3.

The discrete frequency noise is noise resulting from the driven fan 62A. Specifically, the discrete frequency noise is rotational sound having a spectral peak at a frequency proportional to the number of vanes of the fan 62A and the fan rotational speed thereof. For example, in the graph shown in FIG. 3, the sound having a peak at about 60 Hz and the sound having a peak at about 180 Hz are the discrete frequency noise.

The broadband noise is turbulent noise, such as vortices, pressure fluctuation at a boundary layer, and separation of the boundary layer caused by the driven fan 62A.

The in-apparatus environmental noise is environmental noise in the apparatus in which the fan 62A is installed, and is noise produced when the wind generated by the driven fan 62A collides with obstacles in the apparatus. In the present embodiment, the in-apparatus environmental noise is environmental noise in the projector 1A.

The broadband noise and the in-apparatus environmental noise are each a sound that spans a relatively wide frequency band and has a peak lower than that of the discrete frequency noise.

The discharge-side noise containing the discrete frequency noise, the broadband noise, and the in-apparatus environmental noise changes in accordance with the fan rotational speed of the fan 62A. Specifically, the frequency characteristics of the discharge-side noise changes in accordance with the fan rotational speed of the fan 62A.

In view of the fact described above, the characteristic data storage section 651 stores frequency characteristic data representing the frequency characteristics of the discharge-side noise in accordance with the fan rotational speed of the fan 62A, as shown in FIG. 2. The frequency characteristic data is data representing the features of a plurality of frequency components contained in the discharge-side noise.

In detail, the frequency characteristic data representing the frequency characteristics of the discharge-side noise and stored in the characteristic data storage section 651 is data based on actually measured values of the discharge-side noise measured in the exterior enclosure 2 at a position in the vicinity of the discharge port 212 when the fan 62A is driven at a plurality of fan rotational speeds. In detail, the frequency characteristic data on the frequency characteristics of the discharge-side noise is data representing the frequencies of the plurality of frequency components and the sound pressures of the plurality of frequency components obtained by frequency analysis of the values actually measured when the fan 62A is driven at the plurality of fan rotational speeds.

For example, the characteristic data storage section 651 stores frequency characteristic data A1 in correspondence with a case where the fan rotational speed of the fan 62A is 1000 rpm and frequency characteristic data A2 in correspondence with a case where the fan rotational speed of the fan 62A is 2000 rpm. The characteristic data storage section 651 further stores frequency characteristic data An in correspondence with a case where the fan rotational speed of the fan 62A is 1000×n (n is natural number greater than 2).

As described above, the characteristic data storage section 651 stores the frequency characteristic data on the frequency characteristics of the discharge-side noise containing the discrete frequency noise produced by the driven fan 62A, the broadband noise based on the cooling gas flow generated by the driven fan 62A, and the in-apparatus environmental noise in accordance with the fan rotational speed of the fan 62A.

Configuration of Phase Data Storage Section

The phase data storage section 652 stores phase data representing the phase of at least one of the plurality of frequency components contained in the discharge-side noise. In the present embodiment, the phase data storage section 652 stores phase data representing the phase of each of the plurality of frequency components contained in the discharge-side noise.

It is noted that the discharge-side noise can be efficiently reduced by causing the interference sound opposite in terms of phase from the discharge-side noise to interfere with the discharge-side noise. On the other hand, the phases of the plurality of frequency components contained in the discharge-side noise are hardly aligned with each other.

In view of the fact described above, the phase data storage section 652 stores the phases of the frequency components contained in the discharge-side noise and corresponding to the rotational position of the fan 62A in accordance with the fan rotational speed of the fan 62A in the present embodiment.

For example, the phase data storage section 652 stores phase data B1 in accordance with a case where the fan rotational speed of the fan 62A is 1000 rpm and the rotational position of the fan 62A is 0°, as shown in FIG. 2. The phase data storage section 652 further stores, for example, phase data B2 in accordance with a case where the fan rotational speed of the fan is 1000 rpm and the rotational position of the fan 62A is 10.

The phase data storage section 652 further stores, for example, phase data B359 in accordance with a case where the fan rotational speed of the fan is 1000 rpm and the rotational position of the fan 62A is 359°. The phase data storage section 652 further stores phase data representing the phases of the frequency components in cases where the fan rotational speed is other speeds in accordance with the rotational position of the fan 62A.

As described above, the phase data storage section 652 stores the phase data representing the phases of the plurality of frequency components contained in the discharge-side noise in accordance with the fan rotational speed and the rotational position of the fan 62A.

Configuration of Control Section

Figure 4:
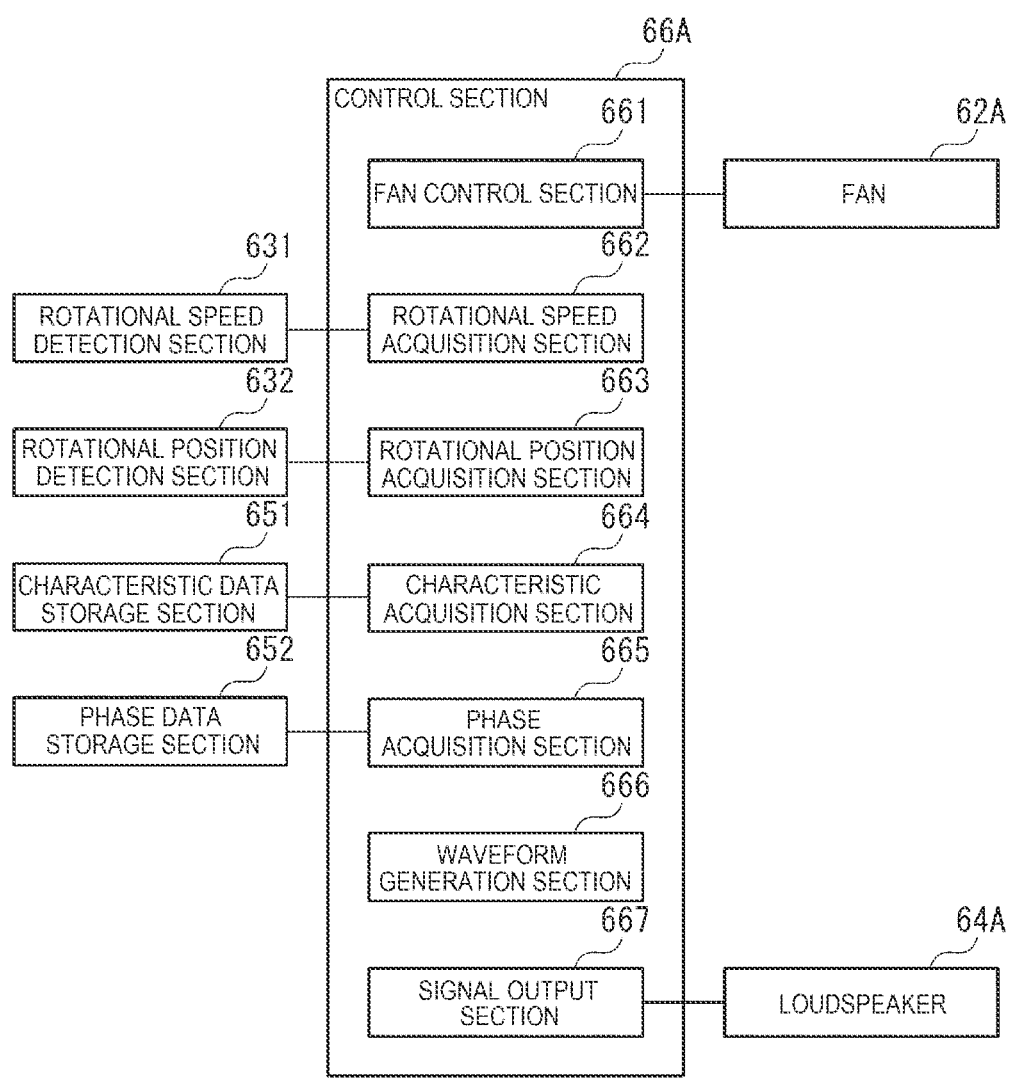
FIG. 4 is a block diagram showing the configuration of a control section according to the first embodiment.

FIG. 4 is a block diagram showing the configuration of the control section 66A.

The control section 66A controls the operation of the cooling apparatus 6A based on control signals inputted from the control apparatus 5. Specifically, the control section 66A controls the operation of the fan 62A and outputs a drive signal to the loudspeaker 64A to cause the loudspeaker 64A to emit the discharge-side interference sound. The control section 66A includes a fan control section 661, a rotational speed acquisition section 662, a rotational position acquisition section 663, a characteristic acquisition section 664, a phase acquisition section 665, a waveform generation section 666, and a signal output section 667, as shown in FIG. 4.

The fan control section 661 drives the fan 62A based on a control signal inputted from the control apparatus 5. For example, when a control signal representing the fan rotational speed or an operation mode is inputted from the control apparatus 5, the fan control section 661 applies a fan voltage, out of the fan voltages stored in the storage section 65A, corresponding to the inputted control signal to the fan 62A. The fan 62A is thus driven at a fan rotational speed specified by the control apparatus 5.

The rotational speed acquisition section 662 acquires the fan rotational speed of the fan 62A detected by the rotational speed detection section 631.

The rotational position acquisition section 663 acquires the rotational position (angle of rotation) of the fan 62A detected by the rotational position detection section 632.

The characteristic acquisition section 664 acquires from the characteristic data storage section 651 the frequency characteristic data representing the frequency characteristics of the discharge-side noise and corresponding to the fan rotational speed of the fan 62A acquired by the rotational speed acquisition section 662.

The phase acquisition section 665 acquires from the phase data storage section 652 the phase data representing the phase of the discharge-side noise and corresponding to the fan rotational speed of the fan 62A acquired by the rotational speed acquisition section 662 and the rotational position of the fan 62A acquired by the rotational position acquisition section 663.

The waveform generation section 666 generates the waveform of the interference sound, which interferes with the discharge-side noise, based on the frequency characteristic data representing the frequency characteristics of the discharge-side noise and acquired by the characteristic acquisition section 664 and the phase data representing the phase of the discharge-side noise and acquired by the phase acquisition section 665.

For example, the waveform generation section 666 first generates the waveform of each of the frequency components indicated by the acquired frequency characteristic data on the frequency characteristics of the discharge-side noise.

The waveform generation section 666 then adjusts the phase of the generated waveform of each of the frequency components based on the acquired phase data on the phase of the discharge-side noise.

The waveform generation section 666 then combines the waveforms of the frequency components having the adjusted phases with one another to generate the waveform of the discharge-side noise.

The waveform generation section 666 inverts the generated waveform of the discharge-side noise to generate the waveform of the discharge-side interference sound. That is, the waveform generation section 666 generates the waveform of the discharge-side interference sound to be emitted from the loudspeaker 64A.

The signal output section 667 generates a drive signal according to the waveform of the discharge-side interference sound generated by the waveform generation section 666 and outputs the generated drive signal to the loudspeaker 64A to cause the loudspeaker 64A to emit the discharge-side interference sound. The signal output section 667 may adjust the timing at which the drive signal is outputted to the loudspeaker 64A in such a way that the discharge-side interference sound emitted from the loudspeaker 64A appropriately interferes with the discharge-side noise propagating through the duct 61A.

When the discharge-side interference sound emitted from the loudspeaker 64A interferes with the discharge-side noise as described above, the discharge-side noise leaking out of the exterior enclosure 2 via the discharge port 212 decreases. In this process, the discharge-side interference sound contains not only the component that interferes with the discrete frequency noise resulting from the driven fan 62A, but also components that interfere with the broadband noise resulting from the flow generated by the driven fan 62A and the in-apparatus environmental noise, whereby the discharge-side noise leaking out of the projector 1A effectively decreases.

Effects of First Embodiment

The projector 1A according to the present embodiment described above provides the effects below.

The projector 1A includes the exterior enclosure 2, the light source 30, the fan 62A, the loudspeaker 64A, the characteristic data storage section 651, and the control section 66A. The exterior enclosure 2 has the intake port 241 and the discharge port 212. The light source 30 is a heat source disposed in the exterior enclosure 2. The fan 62A causes the cooling gas to flow to the light source 30. The loudspeaker 64A is disposed between the discharge port 212 and the fan 62A in the channel of the cooling gas and outputs a sound wave according to a drive signal inputted to the loudspeaker 64A.

The characteristic data storage section 651 stores the frequency characteristic data on the frequency characteristics of the discharge-side noise containing the discrete frequency noise produced by the driven fan 62A, the broadband noise based on the cooling gas flow generated by the driven fan 62A, and the in-apparatus environmental noise in accordance with the rotational speed of the fan 62A per unit time. In the present embodiment, the discharge-side noise corresponds to the first noise. The control section 66A generates a drive signal to be outputted to the loudspeaker 64A.

The control section 66A includes the characteristic acquisition section 664, the waveform generation section 666, and the signal output section 667. The characteristic acquisition section 664 acquires the frequency characteristic data corresponding to the rotational speed of the fan 62A per unit time from the characteristic data storage section 651. The waveform generation section 666 generates the waveform of the discharge-side interference sound (interference sound), which interferes with the discharge-side noise leaking out of the exterior enclosure 2 via the discharge port 212, based on the frequency characteristic data representing the frequency characteristics of the discharge-side noise and acquired by the characteristic acquisition section 664. The signal output section 667 outputs a drive signal based on the waveform generated by the waveform generation section 666 to the loudspeaker 64A.

According to the configuration described above, in which the characteristic acquisition section 664 acquires the frequency characteristic data corresponding to the fan rotational speed of the fan 62A from the characteristic data storage section 651, the control section 66A can acquire the frequency characteristics of the discharge-side noise leaking out of the exterior enclosure 2. The waveform generation section 666 generates the waveform of the discharge-side interference sound (interference sound), which interferes with the discharge-side noise, and the signal output section 667 outputs a drive signal based on the generated waveform of the discharge-side interference sound to the loudspeaker 64A.

The discharge-side interference sound can thus be emitted from the loudspeaker 64A with no need for a microphone that detects the discharge-side noise. The configuration of the projector 1A can therefore be simplified. In addition, since the discharge-side noise includes the discrete frequency noise, the broadband noise, and the in-apparatus environmental noise, the range of reducible noise can be expanded.

In other words, the cooling apparatus 6A includes the fan 62A, the loudspeaker 64A, the characteristic data storage section 651, and the control section 66A. The fan 62A causes the cooling gas to flow to the light source 30, which is a heat source. The loudspeaker 64A outputs a sound wave according to a drive signal inputted thereto. The characteristic data storage section 651 stores the frequency characteristic data on the frequency characteristics of the discharge-side noise containing the discrete frequency noise produced by the driven fan 62A, the broadband noise based on the cooling gas flow generated by the driven fan 62A, and the environmental noise in accordance with the fan rotational speed of the fan 62A. The control section 66A generates a drive signal to be outputted to the loudspeaker 64A.

The control section 66A includes the characteristic acquisition section 664, the waveform generation section 666, and the signal output section 667. The characteristic acquisition section 664 acquires the frequency characteristic data corresponding to the fan rotational speed of the fan 62A from the characteristic data storage section 651. The waveform generation section 666 generates the waveform of discharge-side interference sound (interference sound), which reduces the discharge-side noise, based on the frequency characteristic data acquired by the characteristic acquisition section 664. The signal output section 667 outputs a drive signal based on the waveform of the discharge-side interference sound generated by the waveform generation section 666 to the loudspeaker 64A.

According to the configuration described above, the discharge-side interference sound (interference sound), which interferes with the discharge-side noise, can be emitted from the loudspeaker 64A with no need for a microphone that detects the discharge-side noise, as described above, whereby the configuration of the projector 1A can be simplified, and the range of reducible noise can be expanded.

The cooling apparatus 6A of the projector 1A includes the rotational speed detection section 631, which detects the fan rotational speed of the fan 62A. The characteristic acquisition section 664 acquires the frequency characteristic data corresponding to the fan rotational speed of the fan 62A detected by the rotational speed detection section 631.

According to the configuration described above, the characteristic acquisition section 664 can acquire the frequency characteristic data corresponding to the actual fan rotational speed of the fan 62A, whereby the waveform of the discharge-side noise can be reproduced more accurately, and in turn the discharge-side interference sound, which effectively interferes with the discharge-side noise, can be emitted from the loudspeaker 64A. The discharge-side noise emitted out of the projector 1A can therefore be effectively reduced.

The cooling apparatus 6A of the projector 1A includes the rotational position detection section 632 and the phase data storage section 652. The rotational position detection section 632 detects the rotational position of the fan 62A. The phase data storage section 652 stores phase data in accordance with the fan rotational speed of the fan 62A, the phase data representing the phases of a plurality of frequency components contained in the discharge-side noise and according to the rotational position of the fan 62A. The control section 66A includes the phase acquisition section 665, which acquires the phase data corresponding to the rotational position of the fan 62A detected by the rotational position detection section 632 from the phase data storage section 652. The waveform generation section 666 generates the waveform of the discharge-side interference sound (interference sound) based on the frequency characteristic data acquired by the characteristic acquisition section 664 and the phase data acquired by the phase acquisition section 665.

According to the configuration described above, the phase acquisition section 665 acquires the phase data according to the rotational position of the fan 62A detected by the rotational position detection section 632, and the waveform generation section 666 generates the waveform of the discharge-side interference sound (interference sound) based on the frequency characteristic data acquired by the characteristic acquisition section 664 and the phase data acquired by the phase acquisition section 665. The interference sound that can effectively reduce the discharge-side noise can therefore be emitted from the loudspeaker 64A to effectively reduce the discharge-side noise.

In the cooling apparatus 6A of the projector 1A, the frequency characteristic data is data representing the features of at least one of the plurality of frequency components contained in the discharge-side noise.

According to the configuration described above, based on the features of the frequency components indicated by the frequency characteristic data, the discharge-side interference sound (interference sound), which can interfere with at least one frequency component contained in the discharge-side noise to effectively reduce the at least one frequency component, can be emitted from the loudspeaker 64A. The discharge-side noise can therefore be effectively reduced.

The control method executed by the control section 66A is executed in the projector 1A, which is an electronic instrument including the fan 62A, which causes the cooling gas to flow to the light source 30, which is a heat source, and the loudspeaker 64A, which outputs a sound wave according to a drive signal inputted thereto. In the control method, the frequency characteristic data on the frequency characteristics of the discharge-side noise containing the discrete frequency noise produced by the driven fan 62A, the broadband noise based on the cooling gas flow generated by the driven fan 62A, and the in-apparatus environmental noise is acquired in accordance with the rotational speed of the fan 62A per unit time.

The waveform of the discharge-side interference sound (interference sound), which interferes with the discharge-side noise leaking out of the projector 1A, is then generated, based on the acquired frequency characteristic data. A drive signal based on the generated waveform of the interference sound is then outputted to the loudspeaker 64A.

According to the configuration described above, the same effects as those provided by the projector 1A or the cooling apparatus 6A described above can be provided.

Second Embodiment

A second embodiment of the present disclosure will next be described.

The projector according to the present embodiment has the same configuration as that of the projector 1A according to the first embodiment. In the projector 1A, the loudspeaker 64A is provided between the fan 62A and the discharge port 212, via which the cooling gas having cooled the light source 30, which is a heat source disposed in the exterior enclosure 2, is discharged.

In contrast, in the projector according to the present embodiment, the loudspeaker is provided between the fan and the intake port 241, via which the cooling gas is taken into the exterior enclosure 2. The projector according to the present embodiment differs in this regard from the projector 1A according to the first embodiment. In the following description, portions that are the same or substantially the same as the portions having been already described have the same reference characters and will not be describe.

Configuration of Projector

Figure 5:
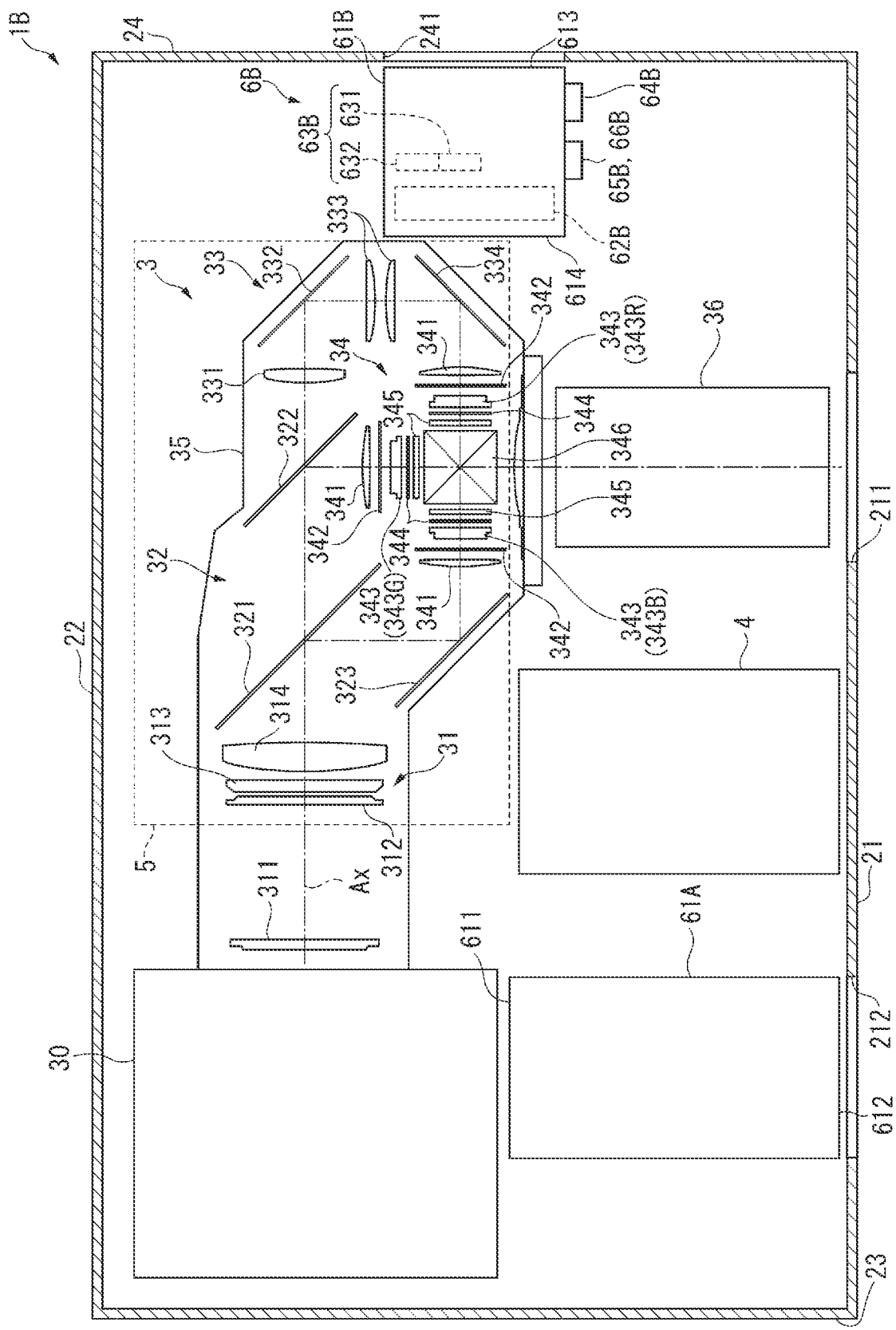
FIG. 5 is a diagrammatic view showing the configuration of the projector according to a second embodiment.

FIG. 5 is a diagrammatic view showing the configuration of a projector 1B according to the present embodiment. That is, FIG. 5 shows the arrangement of a cooling apparatus 6B in the exterior enclosure 2.

The projector 1B according to the present embodiment has the same configuration and function as those of the projector 1A according to the first embodiment except that the cooling apparatus 6A according to the first embodiment is replaced with the cooling apparatus 6B shown in FIG. 5.

Configuration of Cooling Apparatus

The cooling apparatus 6B is provided in association with the intake port 241 and has the function of causing the cooling gas introduced into the exterior enclosure 2 via the intake port 241 to flow to the heat sources to cool the heat sources and the function of reducing intake-side noise leaking out of the exterior enclosure 2 via the intake port 241. In the present embodiment, the intake-side noise corresponds to the first noise.

The cooling apparatus 6B includes a duct 61B, a fan 62B, a detection section 63B, a loudspeaker 64B, a storage section 65B, and a control section 66B.

Configuration of Duct

The duct 61B is a tubular element extending along the direction +Z and includes an introduction port 613 and an exit port 614. The duct 61B is configured to allow the cooling gas to flow through the interior of the duct 61B from the introduction port 613 toward the exit port 614.

That is, the duct 61B has an inner channel through which the cooling gas can flow. The duct 61B is provided in association with the intake port 241 and guides the cooling gas introduced into the exterior enclosure 2 via the intake port 241 to the image formation section 34. The inner surface of the duct 61B may be provided with a sound-absorbing material.

The introduction port 613 is provided on a side of the duct 61B, the side facing the right side surface section 24. That is, the introduction port 613 is provided in a portion of the duct 61B, the portion corresponding to the intake port 241. The introduction port 613 is an opening via which the air outside the exterior enclosure 2 is introduced as the cooling gas via the intake port 241 into the duct 61B.

The exit port 614 is provided on at an end of the duct 61B, the end opposite from the introduction port 613. That is, the exit port 614 is provided at an end of the duct 61B, the end facing the direction −Z. The exit port 614 is an opening via which the cooling gas having flowed through the duct 61B is caused to exit out of the duct 61B.

That is, the exit port 614 opens toward the image formation section 34 and guides the cooling gas having flowed through the duct 61B to the image formation section 34.

Configuration of Fan

The fan 62B is provided in the duct 61B. In detail, the fan 62B is disposed in the duct 61B in a position shifted from the loudspeaker 64B toward the exit port 614. The fan 62B sucks the air outside the exterior enclosure 2 as the cooling gas into the duct 61B and causes the sucked cooling gas to flow to the image formation section 34, which is a heat source. In the present embodiment, the fan 62B is an axial fan and may instead be a centrifugal fan.

Configuration of Detection Section

The detection section 63B includes the rotational speed detection section 631, which detects the rotational speed of the fan 62B per unit time, and the rotational position detection section 632, which detects the rotational position of the fan 62B, as the detection section 63A in the first embodiment does.

That is, the rotational speed detection section 631 of the detection section 63B detects the fan rotational speed of the fan 62B. The detection section 63B outputs to the control section 66B the rotational speed of the fan 62B detected by the rotational speed detection section 631 and the rotational position of the fan 62B detected by the rotational position detection section 632.

Configuration of Loudspeaker

The loudspeaker 64B is provided in the duct 61B and emits a sound wave according to a drive signal inputted from the control section 66B. Specifically, the loudspeaker 64B is disposed between the intake port 241 and the fan 62B in the channel of the cooling gas and emits an interference sound according to the inputted drive signal. The interference sound emitted by the loudspeaker 64B is hereafter referred to as an intake-side interference sound.

The intake-side interference sound is a sound wave that interferes with the intake-side noise that propagates in the duct 61B and leaks out of the exterior enclosure 2 via the intake port 241 to reduce the intake-side noise. In detail, the intake-side interference sound is a sound wave opposite in terms of phase from the intake-side noise. The intake-side interference sound emitted from the loudspeaker 64B interferes with the intake-side noise in the duct 61B to reduce the sound pressure of the intake-side noise emitted out of the projector 1B. The detail of the drive signal inputted to the loudspeaker 64B will be described later.

Configuration of Storage Section

The storage section 65B stores data necessary for the function of the cooling apparatus 6B. For example, the storage section 65B stores a fan voltage to be applied to the fan 62B to rotate the fan 62B at a predetermined fan rotational speed, as the storage section 65A does. The storage section 65B includes the characteristic data storage section 651 and the phase data storage section 652, as the storage section 65A does.

The characteristic data storage section 651 and the phase data storage section 652 of the storage section 65B will be described below.

The characteristic data storage section 651 stores frequency characteristic data on the frequency characteristics of the intake-side noise, which contains the discrete frequency noise produced by the driven fan 62B, the broadband noise based on the cooling gas flow generated by the driven fan 62B, and the in-apparatus environmental noise, in accordance with the fan rotational speed of the fan 62B. In the present embodiment, the frequency characteristic data stored in the characteristic data storage section 651 represents the features of a plurality of frequency components based on the result of frequency analysis of actually measured values of the intake-side noise measured in the exterior enclosure 2 in the vicinity of the intake port 241. Specifically, the frequency characteristic data contains the frequencies of the plurality of frequency components contained in the intake-side noise and the sound pressures of the plurality of frequency components.

The phase data storage section 652 stores phase data which represents the phases of the plurality of frequency components contained in the intake-side noise and corresponds to the rotational position of the fan 62B, in accordance with the fan rotational speed of the fan 62B. Specifically, the phase data storage section 652 stores the phases of the plurality of frequency components contained in the intake-side noise for each rotational position of the fan 62B, which is incremented by 1°, in accordance with the fan rotational speed of the fan 62B, as the phase data storage section 652 of the storage section 65A does.

Configuration of Control Section

The control section 66B controls the operation of the cooling apparatus 6B based on the control signals inputted from the control apparatus 5. Specifically, the control section 66B controls the operation of the fan 62B and causes the loudspeaker 64B to emit the intake-side interference sound. The control section 66B includes, although not shown, the fan control section 661, the rotational speed acquisition section 662, the rotational position acquisition section 663, the characteristic acquisition section 664, the phase acquisition section 665, the waveform generation section 666, and the signal output section 667, as the control section 66A does.

The fan control section 661, the rotational speed acquisition section 662, the rotational position acquisition section 663, the characteristic acquisition section 664, the phase acquisition section 665, the waveform generation section 666, and the signal output section 667 of the control section 66B will be described below.

The fan control section 661 drives the fan 62B based on a control signal inputted from the control apparatus 5.

The rotational speed acquisition section 662 acquires the detected fan rotational speed of the fan 62B.

The rotational position acquisition section 663 acquires the rotational position (angle of rotation) of the fan 62B detected by the rotational position detection section 632.

The characteristic acquisition section 664 acquires the frequency characteristic data representing the frequency characteristics of the intake-side noise and corresponding to the acquired fan rotational speed of the fan 62B from the characteristic data storage section 651.

The phase acquisition section 665 acquires the phase data representing the phase of the intake-side noise and corresponding to the acquired fan rotational speed and rotational position of the fan 62B from the phase data storage section 652.

The waveform generation section 666 generates the waveform of the intake-side interference sound, which interferes with the intake-side noise, based on the acquired frequency characteristic data on the frequency characteristics of the intake-side noise and the acquired phase data on the phase of the intake-side noise.

The signal output section 667 generates a drive signal according to the generated waveform of the intake-side interference sound and outputs the drive signal to the loudspeaker 64B to cause the loudspeaker 64B to emit the intake-side interference sound. The signal output section 667 may adjust the timing at which the drive signal is outputted to the loudspeaker 64B in such a way that the intake-side interference sound emitted by the loudspeaker 64B appropriately interferes with the intake-side noise propagating through the duct 61B, as described above.

When the intake-side interference sound emitted from the loudspeaker 64B interferes with the intake-side noise as described above, the intake-side noise leaking out of the exterior enclosure 2 via the intake port 241 decreases. In this process, the intake-side interference sound contains not only the component that interferes with the discrete frequency noise resulting from the driven fan 62B, but also component that interferes with the broadband noise resulting from the flow generated by the driven fan 62B, whereby the intake-side noise leaking out of the projector 1B effectively decreases.

Effects of Second Embodiment

The projector 1B according to the present embodiment described above provides the same effects as those provided by the projector 1A according to the first embodiment.

For example, the projector 1B includes the exterior enclosure 2, the image formation section 34, the fan 62B, the loudspeaker 64B, the characteristic data storage section 651, and the control section 66B. The exterior enclosure 2 has the intake port 241 and the discharge port 212. The image formation section 34 is a heat source disposed in the exterior enclosure 2. The fan 62B causes the cooling gas to flow to the image formation section 34. The loudspeaker 64B is disposed between the intake port 241 and the fan 62B in the channel of the cooling gas and outputs a sound wave according to a drive signal inputted to the loudspeaker 64B. The characteristic data storage section 651 of the storage section 65B stores the frequency characteristic data on the frequency characteristics of the intake-side noise, which contains the discrete frequency noise produced by the driven fan 62B, the broadband noise based on the cooling gas flow generated by the driven fan 62B, and the in-apparatus environmental noise, in accordance with the rotational speed of the fan 62B per unit time. In the present embodiment, the intake-side noise corresponds to the first noise. The control section 66B generates a drive signal to be outputted to the loudspeaker 64B.

The control section 66B includes the characteristic acquisition section 664, the waveform generation section 666, and the signal output section 667. The characteristic acquisition section 664 acquires the frequency characteristic data corresponding to the rotational speed of the fan 62B per unit time from the characteristic data storage section 651. The waveform generation section 666 generates the waveform of intake-side interference sound (interference sound), which interferes with the intake-side noise leaking out of the exterior enclosure 2 via the intake port 241, based on the frequency characteristic data representing the frequency characteristics of the intake-side noise and acquired by the characteristic acquisition section 664. The signal output section 667 outputs a drive signal based on the waveform generated by the waveform generation section 666 to the loudspeaker 64B.

In other words, the cooling apparatus 6B includes the fan 62B, the loudspeaker 64B, the characteristic data storage section 651, and the control section 66B. The fan 62B causes the cooling gas to flow to the image formation section 34, which is a heat source. The loudspeaker 64B outputs a sound wave according to the inputted drive signal. The characteristic data storage section 651 stores the frequency characteristic data representing the frequency characteristics of the intake-side noise containing the discrete frequency noise produced by the driven fan 62B, the broadband noise based on the cooling gas flow generated by the driven fan 62B, and the environmental noise in accordance with the fan rotational speed of the fan 62B. The control section 66B generates a drive signal to be outputted to the loudspeaker 64B.

The control section 66B includes the characteristic acquisition section 664, the waveform generation section 666, and the signal output section 667. The characteristic acquisition section 664 acquires the frequency characteristic data corresponding to the fan rotational speed of the fan 62B from the characteristic data storage section 651. The waveform generation section 666 generates the waveform of the intake-side interference sound (interference sound), which reduces the intake-side noise, based on the frequency characteristic data acquired by the characteristic acquisition section 664. The signal output section 667 outputs a drive signal based on the waveform of the intake-side interference sound generated by the waveform generation section 666 to the loudspeaker 64B.

According to the configuration described above, the same effects as those provided by the projector 1B and the cooling apparatus 6B according to the first embodiment can be provided.

Third Embodiment

A third embodiment of the present disclosure will next be described.

The projector according to the present embodiment has the same configuration as those of the projectors 1A and 1B according to the first and second embodiments but differs therefrom in that the cooling apparatus includes a plurality of fans and a plurality of loudspeakers. In the following description, portions that are the same or substantially the same as the portions having been already described have the same reference characters and will not be described.

Configuration of Projector

Figure 6:
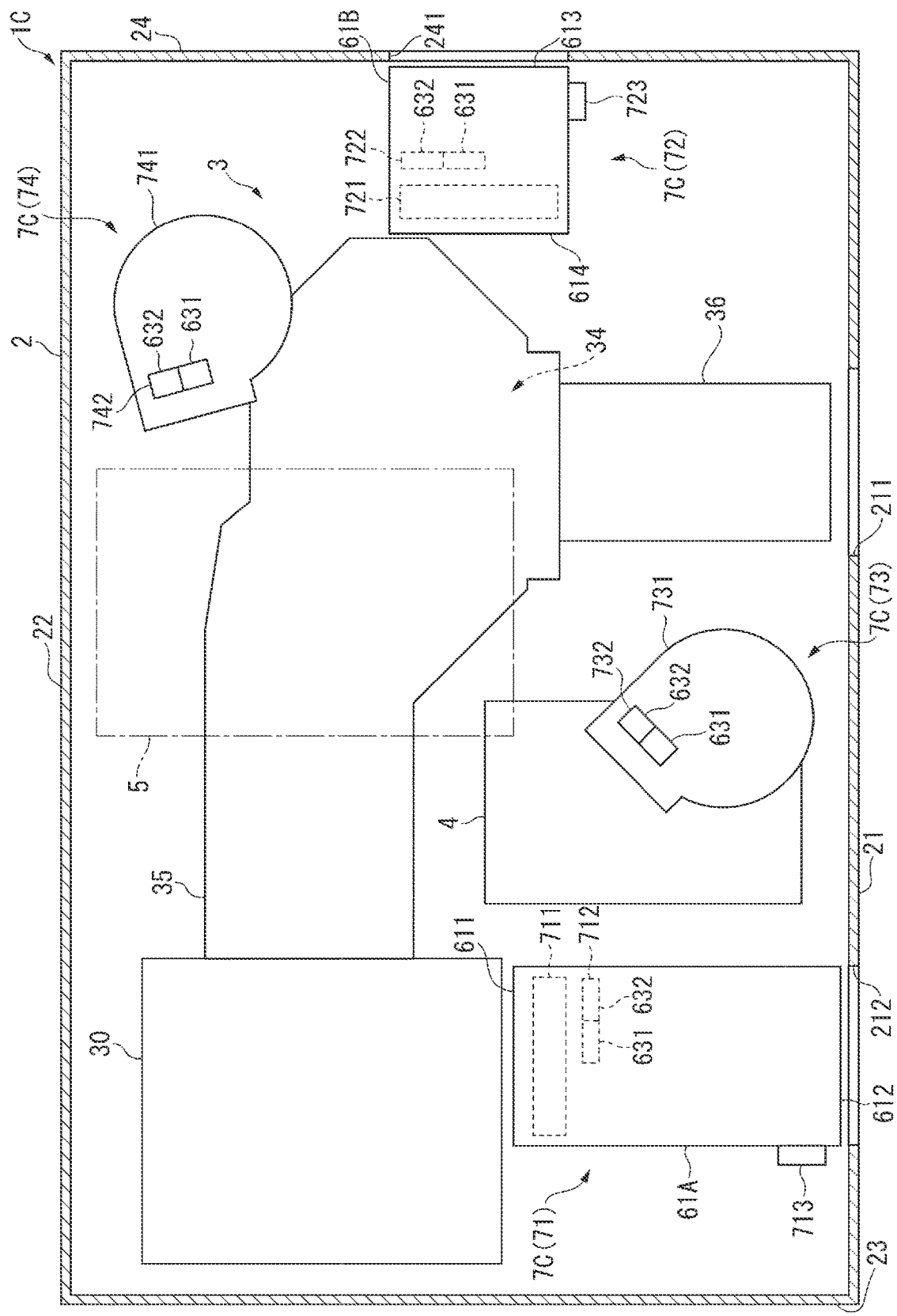
FIG. 6 is a diagrammatic view showing the configuration of the projector according to a third embodiment.

FIG. 6 is a diagrammatic view showing the configuration of a projector 1C according to the present embodiment. In other words, FIG. 6 is a diagrammatic view showing the arrangement of a cooling apparatus 7C in the exterior enclosure 2.

The projector 1C according to the present embodiment has the same configuration and function as those of the projector 1A according to the first embodiment except that the cooling apparatus 6A according to the first embodiment is replaced with the cooling apparatus 7C shown in FIG. 6.

Configuration of Cooling Apparatus

The cooling apparatus 7C has the function of cooling the heat sources that form the projector 1C and the function of reducing noise leaking out of the projector 1C. In the present embodiment, the light source 30, the image formation section 34, the power supply apparatus 4, and the control apparatus 5 are heat sources to be cooled by the cooling apparatus 7C. As shown in FIG. 6, the cooling apparatus 7C includes a first cooling section 71, a second cooling section 72, a third cooling section 73, and a fourth cooling section 74, as well as a storage section 75 and a control section 76C, which are not shown in FIG. 6.

Configuration of First Cooling Section

The first cooling section 71 cools the light source 30 by sucking the cooling gas in the exterior enclosure 2 and causing the cooling gas to flow to the light source 30, which is a cooling target, as the cooling apparatus 6A does. The first cooling section 71 emits the discharge-side interference sound, which interferes with the discharge-side noise leaking out of the exterior enclosure 2 via the discharge port 212, to reduce the discharge-side noise under control by the control section 76C.

The first cooling section 71 includes the duct 61A provided in association with the discharge port 212, a first fan 711, a first detection section 712, and a first loudspeaker 713.

The first fan 711 is disposed in the duct 61A in a position shifted from the first loudspeaker 713 toward the introduction port 611, as the fan 62A is. The first fan 711 sucks the cooling gas in the exterior enclosure 2, causes the cooling gas to flow to the light source 30, and introduces the cooling gas having cooled the light source 30 into the duct 61A via the introduction port 611. The first fan 711 then sends the cooling gas introduced into the duct 61A in the direction +Z to discharge the cooling gas out of the exterior enclosure 2 via the exit port 612 and the discharge port 212. In the present embodiment, the first fan 711 is an axial fan and may instead be a centrifugal fan.

The first detection section 712 includes the rotational speed detection section 631, which detects the rotational speed (fan rotational speed) of the first fan 711 per unit time, and the rotational position detection section 632, which detects the rotational position of the first fan 711, as the detection section 63A according to the first embodiment does. The first detection section 712 outputs the detected fan rotational speed and rotational position of the first fan 711 to the control section 76C.

The first loudspeaker 713 is provided in the duct 61A and outputs the discharge-side interference sound according to a drive signal inputted from the control section 76C, as the loudspeaker 64A is. That is, the first loudspeaker 713 is disposed between the discharge port 212 and the first fan 711 in the channel of the cooling gas and outputs the discharge-side interference sound, which is the sound wave according to the drive signal inputted from the control section 76C. The discharge-side interference sound is a sound wave that interferes with the discharge-side noise propagating in the duct 61A and leaking out of the exterior enclosure 2 via the discharge port 212 to reduce the discharge-side noise, as the discharge-side interference sound in the first embodiment is.

Configuration of Second Cooling Section

The second cooling apparatus 72 causes the cooling gas introduced into the exterior enclosure 2 via the intake port 241 to flow to the image formation section 34 to cool the image formation section 34, as the cooling apparatus 6B does. The second cooling section 72 emits the intake-side interference sound, which interferes with the intake-side noise leaking out of the exterior enclosure 2 via the intake port 241, to reduce the intake-side noise under control by the control section 76C.

The second cooling section 72 includes the duct 61B provided in association with the intake port 241, a second fan 721, a second detection section 722, and a second loudspeaker 723.

The second fan 721 is provided in the duct 61B, as the fan 62B is. In detail, the second fan 721 is disposed in the duct 61B in a position shifted from the second loudspeaker 723 toward the exit port 614. The second fan 721 sucks the air outside the exterior enclosure 2 as the cooling gas into the duct 61B and causes the sucked cooling gas to flow to the image formation section 34. In the present embodiment, the second fan 721 is an axial fan and may instead be a centrifugal fan.

The second detection section 722 includes the rotational speed detection section 631, which detects the fan rotational speed of the second fan 721, and the rotational position detection section 632, which detects the rotational position of the second fan 721, as the detection section 63B in the second embodiment does. The second detection section 722 outputs the detected fan rotational speed and rotational position of the second fan 721 to the control section 76C.

The second loudspeaker 723 is provided in the duct 61B and emits the intake-side interference sound, which is a sound wave according to a drive signal inputted from the control section 76C, as the loudspeaker 64B is. That is, the second loudspeaker 723 is disposed between the intake port 241 and the second fan 721 in the channel of the cooling gas and emits the intake-side interference sound. The intake-side interference sound is a sound wave that interferes with the intake-side noise propagating in the duct 61B and emitted out of the exterior enclosure 2 via the intake port 241 to reduce the intake-side noise.

Configuration of Third Cooling Section

The third cooling section 73 causes the cooling gas in the exterior enclosure 2 to flow to the power supply apparatus 4 to cool the power supply apparatus 4. The third cooling section 73 includes a third fan 731 and a third detection section 732.

The third fan 731 is disposed in the vicinity of the power supply apparatus 4 in the exterior enclosure 2. The third fan 731 causes the cooling gas in the exterior enclosure 2 to flow to the power supply apparatus 4 to cool the power supply apparatus 4 by sucking the cooling gas. In the present embodiment, the third fan 731 is a centrifugal fan and may instead be an axial fan.

The third detection section 732 includes the rotational speed detection section 631, which detects the fan rotational speed of the third fan 731, and the rotational position detection section 632, which detects the rotational position of the third fan 731. The third detection section 732 outputs the detected fan rotational speed and rotational position of the third fan 731 to the control section 76C.

Configuration of Fourth Cooling Section

The fourth cooling section 74 causes the cooling gas in the exterior enclosure 2 to flow to the control apparatus 5 to cool the control apparatus 5. The fourth cooling section 74 includes a fourth fan 741 and a fourth detection section 742.

The fourth fan 741 is disposed in the vicinity of the control apparatus 5 in the exterior enclosure 2. The fourth fan 741 sucks the cooling gas in the exterior enclosure 2 and causes the cooling gas to flow to the control apparatus 5 by sending the cooling gas to the control apparatus 5 to cool the control apparatus 5. In the present embodiment, the fourth fan 741 is a centrifugal fan and may instead be an axial fan.

The fourth detection section 742 includes the rotational speed detection section 631, which detects the fan rotational speed of the fourth fan 741, and the rotational position detection section 632, which detects the rotational position of the fourth fan 741. The fourth detection section 742 outputs the detected fan rotational speed and rotational position of the fourth fan 741 to the control section 76C.

Configuration of Storage Section

Figure 7:
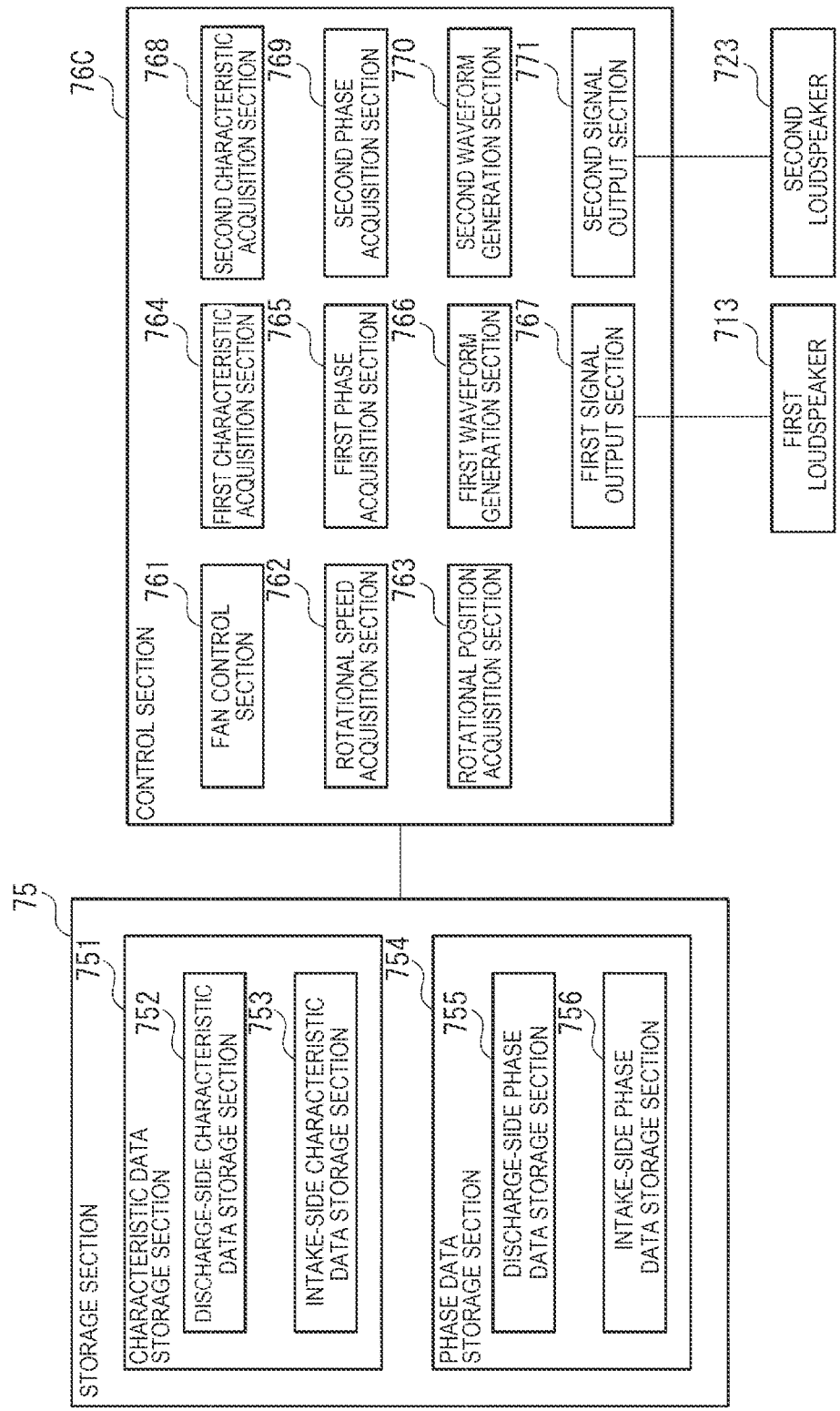
FIG. 7 is a block diagram showing the configurations of the storage section and the control section according to the third embodiment.

FIG. 7 is a block diagram showing the configurations of the storage section 75 and the control section 76C.

The storage section 75 stores data necessary for the function of the cooling apparatus 7C. The storage section 75 stores fan voltages to be applied to the first fan 711, the second fan 721, the third fan 731, and the fourth fan 741. The storage section 75 further includes a characteristic data storage section 751 and a phase data storage section 754, as shown in FIG. 7.

Configuration of Characteristic Data Storage Section

Figure 8:
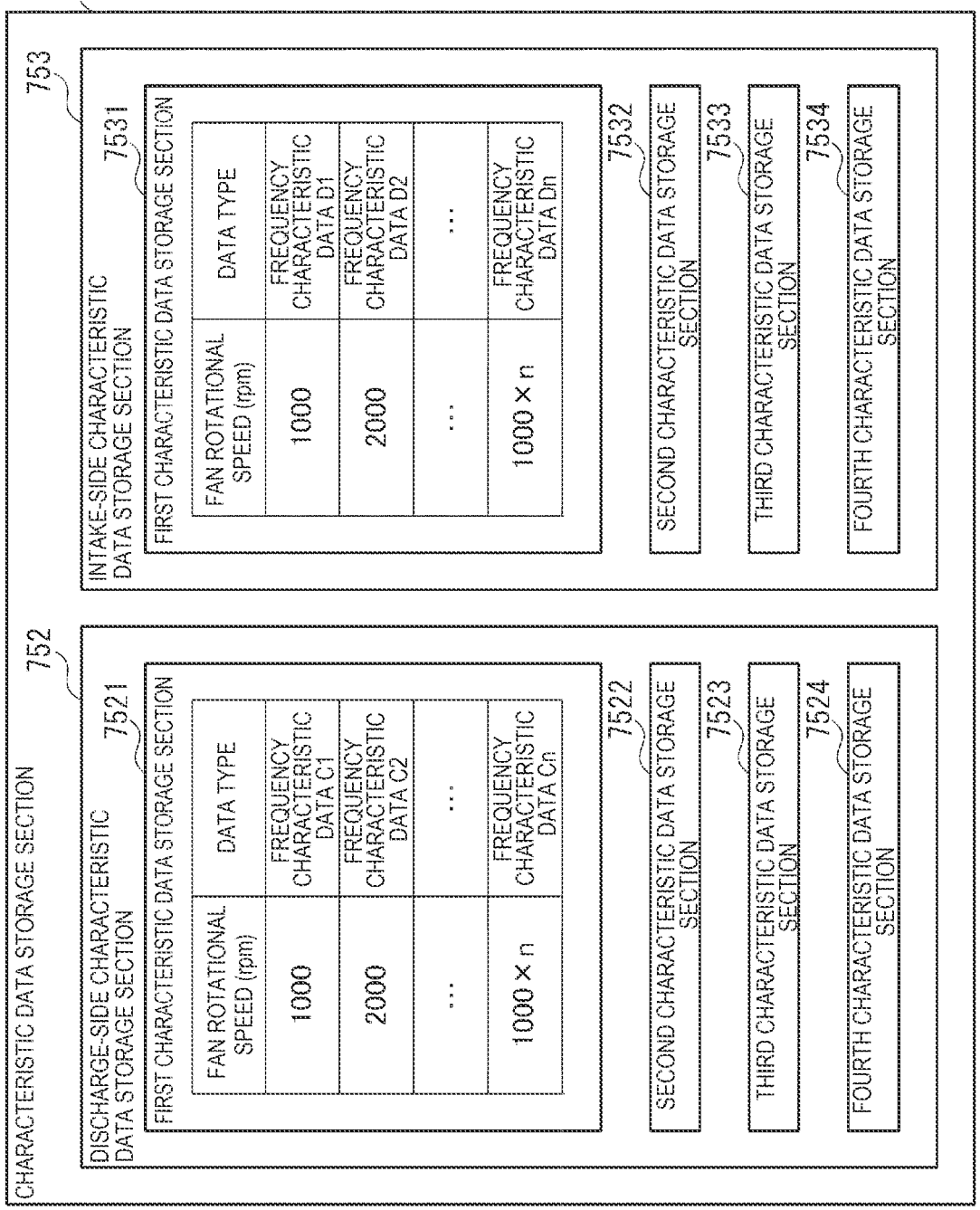
FIG. 8 is a diagrammatic view showing the content stored in a characteristic data storage section according to the third embodiment.

FIG. 8 is a diagrammatic view showing the content stored in the characteristic data storage section 751.

The characteristic data storage section 751 includes a discharge-side characteristic data storage section 752 and an intake-side characteristic data storage section 753, as shown in FIG. 7.

The discharge-side characteristic data storage section 752 stores the frequency characteristic data on the frequency characteristics of discharge-side noise. Specifically, the discharge-side characteristic data storage section 752 stores the frequency characteristic data on the noise for each of the fans disposed in the exterior enclosure 2. In the present embodiment, the discharge-side characteristic data storage section 752 includes a first characteristic data storage section 7521, a second characteristic data storage section 7522, a third characteristic data storage section 7523, and a fourth characteristic data storage section 7524, as shown in FIG. 8.

The first characteristic data storage section 7521 stores the frequency characteristic data on the frequency characteristics of first discharge-side noise resulting from the first fan 711. Specifically, the first characteristic data storage section 7521 stores the frequency characteristic data on the frequency characteristics of the first discharge-side noise, which contains the discrete frequency noise produced by the driven first fan 711, the broadband noise based on the cooling gas flow generated by the driven first fan 711, and the in-apparatus environmental noise, in accordance with the rotational speed of the first fan 711 per unit time. That is, the frequency characteristic data on the frequency characteristics of the first discharge-side noise is data based on the result of frequency analysis of actually measured values of the first discharge-side noise measured in the vicinity of the discharge port 212 in the external enclosure 2 when only the first fan 711 is operated at each fan rotational speed.

For example, the first characteristic data storage section 7521 stores frequency characteristic data C1 corresponding to a case where the fan rotational speed of the first fan 711 is 1000 (rpm), frequency characteristic data C2 corresponding to a case where the fan rotational speed of the first fan 711 is 2000 (rpm), and frequency characteristic data Cn corresponding to a case where the fan rotational speed of the first fan 711 is 1000×n (rpm) (n is natural number greater than 2), as the characteristic data storage section 651 according to the first embodiment does.

The first discharge-side noise corresponds to the first noise in the discharge-side noise.

The second characteristic data storage section 7522 stores the frequency characteristic data on the frequency characteristics of second discharge-side noise resulting from the second fan 721. The second discharge-side noise corresponds to second noise in the discharge-side noise. The third characteristic data storage section 7523 stores the frequency characteristic data on the frequency characteristics of third discharge-side noise resulting from the third fan 731, and the fourth characteristic data storage section 7524 stores the frequency characteristic data on the frequency characteristics of fourth discharge-side noise resulting from the fourth fan 741. The frequency characteristic data on the frequency characteristics of the second discharge-side noise, the frequency characteristic data on the frequency characteristics of third discharge-side noise, and the frequency characteristic data on the frequency characteristics of fourth discharge-side noise are similar to the frequency characteristic data on frequency characteristics of the first discharge-side noise.

That is, the frequency characteristic data on the frequency characteristics of each of the second to fourth discharge-side noise include values actually measured when only the corresponding fan is driven at the fan rotational speed thereof, that is, the features of a plurality of frequency components based on the result of frequency analysis of the actually measured values of the noise measured in the vicinity of the discharge port 212 in the exterior enclosure 2. In the present embodiment, the frequency characteristic data include the frequency and the sound pressure of each of the frequency components.

The intake-side characteristic data storage section 753 stores the frequency characteristic data on the frequency characteristics of the intake-side noise. Specifically, the intake-side characteristic data storage section 753 stores the frequency characteristic data on the frequency characteristics of the noise for each of the fans disposed in the exterior enclosure 2. In the present embodiment, the intake-side characteristic data storage section 753 includes a first characteristic data storage section 7531, a second characteristic data storage section 7532, a third characteristic data storage section 7533, and a fourth characteristic data storage section 7534.

The first characteristic data storage section 7531 stores the frequency characteristic data on the frequency characteristics of first intake-side noise resulting from the first fan 711. Specifically, the first characteristic data storage section 7531 stores the frequency characteristic data on the frequency characteristics of the first intake-side noise, which contains the discrete frequency noise produced by the driven first fan 711, the broadband noise based on the cooling gas flow generated by the driven first fan 711, and the in-apparatus environmental noise, in accordance with the rotational speed of the first fan 711 per unit time. That is, the frequency characteristic data on the frequency characteristics of the first intake-side noise is data based on the result of frequency analysis of actually measured values of the first intake-side noise measured in the vicinity of the intake port 241 in the external enclosure 2 when only the first fan 711 is operated at each fan rotational speed.

For example, the first characteristic data storage section 7531 stores frequency characteristic data D1 corresponding to a case where the fan rotational speed of the first fan 711 is 1000 (rpm), frequency characteristic data D2 corresponding to a case where the fan rotational speed of the first fan 711 is 2000 (rpm), and frequency characteristic data Dn corresponding to a case where the fan rotational speed of the first fan 711 is 1000×n (rpm) (n is natural number greater than 2), as the characteristic data storage section 651 according to the second embodiment does.

The second characteristic data storage section 7532 stores the frequency characteristic data on the frequency characteristics of second intake-side noise resulting from the second fan 721. The second intake-side noise corresponds to second noise in the intake-side noise. The third characteristic data storage section 7533 stores the frequency characteristic data on the frequency characteristics of third intake-side noise resulting from the third fan 731, and the fourth characteristic data storage section 7534 stores the frequency characteristic data on the frequency characteristics of fourth intake-side noise resulting from the fourth fan 741. The frequency characteristic data on the frequency characteristics of the second intake-side noise, the frequency characteristic data on the frequency characteristics of third intake-side noise, and the frequency characteristic data on the frequency characteristics of fourth intake-side noise are similar to the frequency characteristic data on the frequency characteristics of the first discharge-side noise.

That is, the frequency characteristic data on the frequency characteristics of each of the second to fourth intake-side noise include values actually measured when only the corresponding fan is driven at the fan rotational speed thereof, that is, the features of the plurality of frequency components based on the result of frequency analysis of the actually measured values of the noise measured in the vicinity of the discharge port 212 in the exterior enclosure 2. In the present embodiment, the frequency characteristic data include the frequency and the sound pressure of each of the frequency components.

Configuration of Phase Data Storage Section

Figure 9:
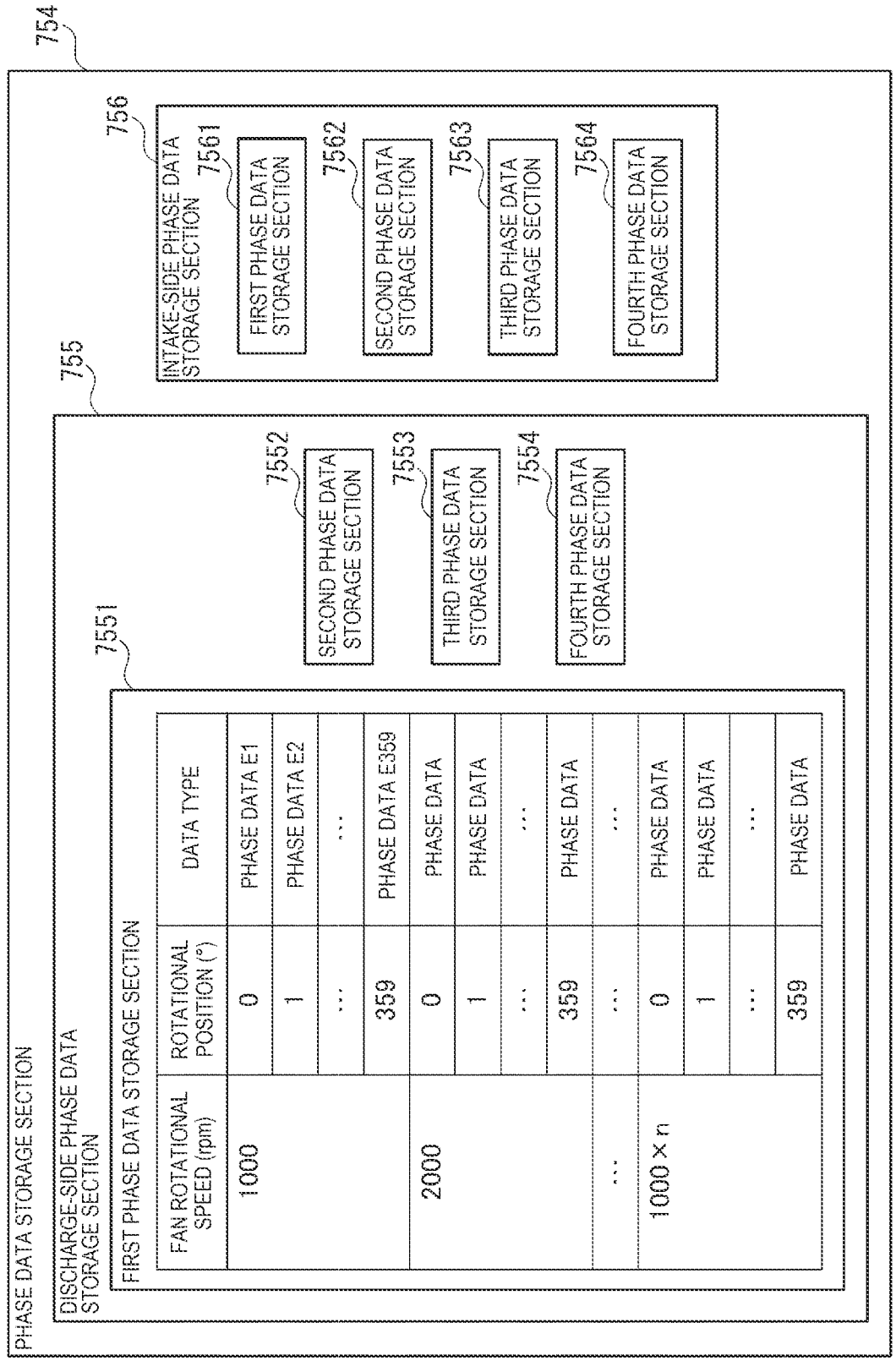
FIG. 9 is a diagrammatic view showing the content stored in a phase data storage section according to the third embodiment.

FIG. 9 is a diagrammatic view showing the content stored in the phase data storage section 754.

The phase data storage section 754 includes a discharge-side phase data storage section 755 and an intake-side phase data storage section 756, as shown in FIG. 9.

The discharge-side phase data storage section 755 stores phase data representing the phases of the plurality of frequency components contained in each of the first to fourth discharge-side noise and according to the rotational position of the corresponding fan on a corresponding fan basis. The discharge-side characteristic data storage section 755 includes a first phase data storage section 7551, a second phase data storage section 7552, a third phase data storage section 7553, and a fourth phase data storage section 7554.

The first phase data storage section 7551 stores phase data representing the phases of the frequency components contained in the first discharge-side noise resulting from the first fan 711. Specifically, the first phase data storage section 7551 stores in accordance with the fan rotational speed of the first fan 711 the phase data representing the phases of the frequency components contained in the first discharge-side noise resulting from the first fan 711 and according to the rotational position of the first fan 711.

For example, the first phase data storage section 7551 stores phase data E1 in accordance with a case where the fan rotational speed of the first fan 711 is 1000 (rpm) and the rotational position of the first fan 711 is 0°, as shown in FIG. 9. Furthermore, for example, the first phase data storage section 7551 stores phase data E2 in accordance with a case where the fan rotational speed of the first fan 711 is 1000 (rpm) and the rotational position of the first fan 711 is 1°. Moreover, for example, the first phase data storage section 7551 stores phase data E359 in accordance with a case where the fan rotational speed of the first fan 711 is 1000 (rpm) and the rotational position of the first fan 711 is 359°.

The first phase data storage section 7551 further stores phase data representing the phases of the frequency components in cases where the fan rotational speed is other speeds for each angle of rotation of the first fan 711, which is incremented by 10.

The first phase data storage section 7551 thus stores the phase data representing the phases of the frequency components for each fan rotational speed of the first fan 711 and for each angle of rotation of the first fan 711, which is incremented by 1°.

The second phase data storage section 7552 stores the phase data representing the phases of the frequency components contained in the second discharge-side noise resulting from the second fan 721. The third phase data storage section 7553 stores the phase data representing the phases of the frequency components contained in the third discharge-side noise resulting from the third fan 731, and the fourth phase data storage section 7554 stores the phase data representing the phases of the frequency components contained in the fourth discharge-side noise resulting from the fourth fan 741.

The phase data stored in the second phase data storage section 7552, the phase data stored in the third phase data storage section 7553, and the phase data stored in the fourth phase data storage section 7554 are similar to the phase data stored in the first phase data storage section 7551. That is, the second phase data storage section 7552, the third phase data storage section 7553, and the fourth phase data storage section 7554 each store the phase data representing the phases of the frequency components contained in the corresponding noise of the second discharge-side noise, the third discharge-side noise, and the fourth discharge-side noise for each fan rotational speed of the corresponding one of the second fan 721, the third fan 731, and the fourth fan 741 and for each angle of rotation of the corresponding fan, which is incremented by 1°.

The intake-side phase data storage section 756 stores the phase data representing the phases of the plurality of frequency components contained in each of the first to fourth intake-side noise and according to the rotational position of the corresponding fan on a corresponding fan basis. The intake-side phase data storage section 756 includes a first phase data storage section 7561, a second phase data storage section 7562, a third phase data storage section 7563, and a fourth phase data storage section 7564.

The first phase data storage section 7561 stores the phase data representing the phases of the frequency components contained in the first intake-side noise resulting from the first fan 711. Specifically, the first phase data storage section 7561 stores in accordance with the fan rotational speed of the first fan 711 the phase data representing the phases of the frequency components contained in the first intake-side noise resulting from the first fan 711 and according to the fan rotational position of the first fan 711.

The second phase data storage section 7562 stores the phase data representing the phases of the frequency components contained in the second intake-side noise resulting from the second fan 721. The third phase data storage section 7563 stores the phase data representing the phases of the frequency components contained in the third intake-side noise resulting from the third fan 731. The fourth phase data storage section 7564 stores the phase data representing the phases of the frequency components contained in the fourth intake-side noise resulting from the fourth fan 741.

The phase data stored in the second phase data storage section 7562, the phase data stored in the third phase data storage section 7563, and the phase data stored in the fourth phase data storage section 7564 are similar to the phase data stored in the first phase data storage section 7561. That is, the second phase data storage section 7562, the third phase data storage section 7563, and the fourth phase data storage section 7564 each store the phase data representing the phases of the frequency components contained in the corresponding noise of the second intake-side noise, the third intake-side noise, and the fourth intake-side noise for each fan rotational speed of the corresponding one of the second fan 721, the third fan 731, and the fourth fan 741 and for each angle of rotation of the corresponding fan, which is incremented by 1°.

Configuration of Control Section

The control section 76C controls the operation of the cooling apparatus 7C based on the control signals inputted from the control apparatus 5, as the control sections 66A and 66B do. Specifically, the control section 76C drives the fans 711, 721, 731, and 741 based on the inputted control signals. In addition, the control section 76C outputs drive signals to the first loudspeaker 713 and the second loudspeaker 723 to cause the first loudspeaker 713 to emit the discharge-side interference sound and the second loudspeaker 723 to emit the intake-side interference sound.

The control section 76C includes a fan control section 761, a rotational speed acquisition section 762, a rotational position acquisition section 763, a first characteristic acquisition section 764, a first phase acquisition section 765, a first waveform generation section 766, a first signal output section 767, a second characteristic acquisition section 768, a second phase acquisition section 769, a second waveform generation section 770, and a second signal output section 771, as shown in FIG. 7.

The fan control section 761 drives the fans 711, 721, 731, and 741 based on control signals inputted from the control apparatus 5, as the fan control section 661 does.

The rotational speed acquisition section 762 acquires the fan rotational speeds of the fans 711, 721, 731, and 741 detected by the rotational speed detection sections 631 of the detection sections 712, 722, 732, and 742.

The rotational position acquisition section 763 acquires the rotational positions (angles of rotation) of the fans 711, 721, 731, and 741 detected by the rotational position detection sections 632 of the detection sections 712, 722, 732, and 742.

The first characteristic acquisition section 764, the first phase acquisition section 765, the first waveform generation section 766, and the first signal output section 767 form a functional portion that emits the discharge-side interference sound, which interferes with the discharge-side noise, from the first loudspeaker 713.

The first characteristic acquisition section 764 acquires from the first characteristic data storage section 7521 of the discharge-side characteristic data storage section 752 the frequency characteristic data representing the frequency characteristics of the first discharge-side noise and corresponding to the fan rotational speed of the first fan 711 acquired by the rotational speed acquisition section 762. The first characteristic acquisition section 764 further acquires from the second characteristic data storage section 7522 of the discharge-side characteristic data storage section 752 the frequency characteristic data representing the frequency characteristics of the second discharge-side noise and corresponding to the fan rotational speed of the second fan 721 acquired by the rotational speed acquisition section 762. The first characteristic acquisition section 764 further acquires from the third characteristic data storage section 7523 of the discharge-side characteristic data storage section 752 the frequency characteristic data representing the frequency characteristics of the third discharge-side noise and corresponding to the fan rotational speed of the third fan 731 acquired by the rotational speed acquisition section 762. Similarly, the first characteristic acquisition section 764 acquires from the fourth characteristic data storage section 7524 of the discharge-side characteristic data storage section 752 the frequency characteristic data representing the frequency characteristics of the fourth discharge-side noise and corresponding to the fan rotational speed of the fourth fan 741 acquired by the rotational speed acquisition section 762.

The first phase acquisition section 765 acquires from the first phase data storage section 7551 of the phase data storage section 754 the phase data corresponding to the fan rotational speed and the rotational position of the first fan 711 acquired by the rotational speed acquisition section 762 and the rotational position acquisition section 763. The first phase acquisition section 765 further acquires from the second phase data storage section 7552 of the phase data storage section 754 the phase data corresponding to the fan rotational speed and the rotational position of the second fan 721 acquired by the rotational speed acquisition section 762 and the rotational position acquisition section 763. The first phase acquisition section 765 further acquires from the third phase data storage section 7553 of the phase data storage section 754 the phase data corresponding to the fan rotational speed and the rotational position of the third fan 731 acquired by the rotational speed acquisition section 762 and the rotational position acquisition section 763. Similarly, the first phase acquisition section 765 acquires from the fourth phase data storage section 7554 of the phase data storage section 754 the phase data corresponding to the fan rotational speed and the rotational position of the fourth fan 741 acquired by the rotational speed acquisition section 762 and the rotational position acquisition section 763.

The first waveform generation section 766 generates the waveform of the discharge-side interference sound, which interferes with the discharge-side noise, based on the frequency characteristic data corresponding to the fan rotational speeds of the fans 711, 721, 731, and 741 and acquired by the first characteristic acquisition section 764 and the phase data corresponding to the fan rotational speeds and the rotational positions of the fans 711, 721, 731, and 741 and acquired by the first phase acquisition section 765, as the waveform generation section 666 does.

For example, the first waveform generation section 766 generates the waveform of the discharge-side interference sound as follows.

First, the first waveform generation section 766 generates the waveform of the interference sound for the first discharge-side noise based on the frequency characteristic data corresponding to the fan rotational speed of the first fan 711 and the phase data corresponding to the fan rotational speed and the rotational position of the first fan 711. Similarly, the first waveform generation section 766 generates the waveform of the interference sound for the second discharge-side noise based on the frequency characteristic data corresponding to the fan rotational speed of the second fan 721 and the phase data corresponding to the fan rotational speed and the rotational position of the second fan 721. The first waveform generation section 766 uses the same method to generate the waveform of the interference sound for the third discharge-side noise and the waveform of the interference sound for the fourth discharge-side noise.

The first waveform generation section 766 then combines the waveforms of the interference sounds generated as described above with one another to generate the waveform of the discharge-side interference sound. The discharge-side interference sound therefore contains interference sounds that interfere with the first discharge-side noise, the second discharge-side noise, the third discharge-side noise, and the fourth discharge-side noise.

The first waveform generation section 766 may instead generate the waveform of the first discharge-side noise, the waveform of the second discharge-side noise, the waveform of the third discharge-side noise, and the waveform of the fourth discharge-side noise based on the respective frequency characteristic data and phase data, combine the generated waveforms with one another to generate the waveform of the discharge-side noise, and then generate the waveform opposite in terms of phase from the discharge-side noise as the waveform of the discharge-side interference sound.

The first signal output section 767 outputs a drive signal according to the waveform of the discharge-side interference sound generated by the first waveform generation section 766 to the first loudspeaker 713 to cause the first loudspeaker 713 to emit the discharge-side interference sound.

That is, the control section 76C generates the drive signal to be outputted to the first loudspeaker 713. The first signal output section 767 may adjust the timing at which the drive signal is outputted to the first loudspeaker 713 in such a way that the discharge-side interference sound emitted by the first loudspeaker 713 appropriately interferes with the discharge-side noise propagating in the duct 61A.

When the discharge-side interference sound emitted from the first loudspeaker 713 interferes with the discharge-side noise as described above, the discharge-side noise leaking out of the exterior enclosure 2 via the discharge port 212 decreases. In this process, the discharge-side interference sound contains not only the components that interfere with the discrete frequency noise resulting from the driven fans 711, 721, 731, and 741, but also the components that interfere with the broadband noise resulting from the flow generated by the driven fans 711, 721, 731, and 741 and the component that interferes with the in-apparatus environmental noise, whereby the discharge-side noise leaking out of the projector 1C effectively decreases, as in the first embodiment described above.

The second characteristic acquisition section 768, the second phase acquisition section 769, the second waveform generation section 770, and the second signal output section 771 form a functional portion that emits the intake-side interference sound, which interferes with the intake-side noise, from the second loudspeaker 723.

The second characteristic acquisition section 768 acquires from the intake-side characteristic data storage section 753 of the characteristic data storage section 751 the frequency characteristic data corresponding to the fan rotational speeds of the fans 711, 721, 731, and 741 acquired by the rotational speed acquisition section 762, as the first characteristic acquisition section 764 does.

The second phase acquisition section 769 acquires from the intake-side phase data storage section 756 of the phase data storage section 754 the phase data corresponding to the fan rotational speeds and the rotational positions of the fans 711, 721, 731, and 741 acquired by the rotational speed acquisition section 762 and the rotational position acquisition section 763.

The second waveform generation section 770 generates the waveform of the intake-side interference sound, which interferes with the intake-side noise, based on the frequency characteristic data corresponding to the fan rotational speeds of the fans 711, 721, 731, and 741 and acquired by the second characteristic acquisition section 768 and the phase data corresponding to the fan rotational speeds and the rotational positions of the fans 711, 721, 731, and 741 and acquired by the second phase acquisition section 769. The second waveform generation section 770 can generate the waveform of the intake-side interference sound, for example, in the same manner as the first waveform generation section 766 generates the waveform of the discharge-side interference sound.

The second signal output section 771 generates a drive signal according to the waveform of the intake-side interference sound generated by the second waveform generation section 770 and outputs the drive signal to the second loudspeaker 723 to cause the second loudspeaker 723 to emit the intake-side interference sound.

That is, the control section 76C generates the drive signal to be outputted to the second loudspeaker 723. The second signal output section 771 may adjust the timing at which the drive signal is outputted to the second loudspeaker 723 in such a way that the intake-side interference sound emitted by the second loudspeaker 723 appropriately interferes with the intake-side noise propagating in the duct 61B.

When the intake-side interference sound emitted from the second loudspeaker 723 interferes with the intake-side noise as described above, the intake-side noise leaking out of the exterior enclosure 2 via the intake port 241 decreases. In this process, the intake-side interference sound contains not only the components that interfere with the discrete frequency noise resulting from the driven fans 711, 721, 731, and 741, but also the components that interfere with the broadband noise resulting from the flow generated by the driven fans 711, 721, 731, and 741 and the component that interferes with the in-apparatus environmental noise, whereby the intake-side noise leaking out of the projector 1C effectively decreases, as in the second embodiment described above.

Effects of Third Embodiment

The projector 1C according to the present embodiment described above can provide the effects below as well as the same effects as those provided by the projectors 1A and 1B according to the first and second embodiments.

The projector 1C includes the exterior enclosure 2, the light source 30, the image formation section 34, the first fan 711, the second fan 721, the first loudspeaker 713, the second loudspeaker 723, the characteristic data storage section 751, and the control section 76C.

The exterior enclosure 2 has the intake port 241 and the discharge port 212. The light source 30 and the image formation section 34 are heat sources disposed in the exterior enclosure 2. The first fan 711 causes the cooling gas to flow to the light source 30, and the second fan 721 causes the cooling gas to flow to the image formation section 34.

The third fan 731 and the fourth fan 741 cause the cooling gas to flow to the power supply apparatus 4 and the control apparatus 5, which are heat sources disposed in the exterior enclosure 2. The first loudspeaker 713 is disposed between the discharge port 212 and the first fan 711, which is disposed in a position closer to the discharge port 212, out of the first fan 711 and the second fan 721, in the channel of the cooling gas and outputs a sound wave according to a drive signal inputted to the first loudspeaker 713. The second loudspeaker 723 is disposed between the intake port 241 and the second fan 721, which is disposed in a position closer to the intake port 241, out of the first fan 711 and the second fan 721, in the channel of the cooling gas and outputs a sound wave according to a drive signal inputted to the second loudspeaker 723.

The first characteristic data storage section 7521 of the characteristic data storage section 751 stores the frequency characteristic data on the frequency characteristics of the first discharge-side noise (first noise) containing the discrete frequency noise produced by the driven first fan 711, the broadband noise based on the cooling gas flow generated by the driven first fan 711, and the in-apparatus environmental noise in accordance with the rotational speed of the first fan 711 per unit time. The second characteristic data storage section 7522 of the characteristic data storage section 751 stores the frequency characteristic data on the frequency characteristics of the second discharge-side noise (second noise) containing the discrete frequency noise produced by the driven second fan 721, the broadband noise based on the cooling gas flow generated by the driven second fan 721, and the in-apparatus environmental noise in accordance with the rotational speed of the second fan 721 per unit time.

The first characteristic data storage section 7531 of the characteristic data storage section 751 stores the frequency characteristic data on the frequency characteristics of the first intake-side noise (first noise) containing the discrete frequency noise produced by the driven first fan 711, the broadband noise based on the cooling gas flow generated by the driven first fan 711, and the in-apparatus environmental noise in accordance with the rotational speed of the first fan 711 per unit time. The second characteristic data storage section 7532 of the characteristic data storage section 751 stores the frequency characteristic data on the frequency characteristics of the second intake-side noise (second noise) containing the discrete frequency noise produced by the driven second fan 721, the broadband noise based on the cooling gas flow generated by the driven second fan 721, and the in-apparatus environmental noise in accordance with the rotational speed of the second fan 721 per unit time.

The control section 76C generates drive signals to be outputted to the first loudspeaker 713 and the second loudspeaker 723. The control section 76C includes the first characteristic acquisition section 764 and the second characteristic acquisition section 768 as a characteristic acquisition section, the first waveform generation section 766 and the second waveform generation section 770 as a waveform generation section, and the first signal output section 767 and the second signal output section 771 as a signal output section.

The first characteristic acquisition section 764 acquires the frequency characteristic data on the frequency characteristics of the first discharge-side noise corresponding to the rotational speed of the first fan 711 per unit time from the first characteristic data storage section 7521. The first characteristic acquisition section 764 further acquires the frequency characteristic data on the frequency characteristics of the second discharge-side noise corresponding to the rotational speed of the second fan 721 per unit time from the second characteristic data storage section 7522. The first characteristic acquisition section 764 still further acquires the frequency characteristic data on the frequency characteristics of the third discharge-side noise corresponding to the rotational speed of the third fan 731 per unit time and the frequency characteristic data on frequency characteristics of the fourth discharge-side noise corresponding to the rotational speed of the fourth fan 741 per unit time.

The first waveform generation section 766 generates the waveform of the discharge-side interference sound, which interferes with the discharge-side noise leaking out of the exterior enclosure 2 via the discharge port 212 and containing the first to fourth discharge-side noise, based on the frequency characteristic data acquired by the first characteristic acquisition section 764.

The first signal output section 767 outputs a drive signal based on the waveform of the discharge-side interference sound generated by the first waveform generation section 766 to the first loudspeaker 713.

The second characteristic acquisition section 768 acquires the frequency characteristic data on the frequency characteristics of the first intake-side noise corresponding to the rotational speed of the first fan 711 per unit time from the first characteristic data storage section 7531. The second characteristic acquisition section 768 further acquires the frequency characteristic data on the frequency characteristics of the second intake-side noise corresponding to the rotational speed of the second fan 721 per unit time from the second characteristic data storage section 7532. The second characteristic acquisition section 768 still further acquires the frequency characteristic data on the frequency characteristics of the third intake-side noise corresponding to the rotational speed of the third fan 731 per unit time and the frequency characteristic data on the frequency characteristics of the fourth intake-side noise corresponding to the rotational speed of the fourth fan 741 per unit time.

The second waveform generation section 770 generates the waveform of the intake-side interference sound, which interferes with the intake-side noise leaking out of the exterior enclosure 2 via the intake port 241 and containing the first to fourth intake-side noise, based on the frequency characteristic data acquired by the second characteristic acquisition section 768.

The second signal output section 771 outputs a drive signal based on the waveform of the intake-side interference sound generated by the second waveform generation section 770 to the second loudspeaker 723.

According to the configuration described above, the control section 76C allows the first loudspeaker 713 to emit the discharge-side interference sound, which interferes with the discharge-side noise containing the first discharge-side noise and the second discharge-side noise to reduce the discharge-side noise, with no need for a microphone that detects the noise leaking out of the exterior enclosure 2 via the discharge port 212, as in the projectors 1A and 1B according to the first and second embodiments.

Similarly, the control section 76C allows the second loudspeaker 723 to emit the intake-side interference sound, which interferes with the intake-side noise containing the first intake-side noise and the second intake-side noise to reduce the intake-side noise, with no need for a microphone that detects the noise leaking out of the exterior enclosure 2 via the intake port 241.

Since the discharge-side noise and the intake-side noise each contain the discrete frequency noise, the broadband noise, and the in-apparatus environmental noise produced by the fans 711, 721, 731, and 741, the range of noise reduced by emitting the discharge-side interference sound and the intake-side interference sound can be expanded. Therefore, the configuration of the projector 1C can be simplified, and the discharge-side noise and the intake-side noise can be effectively reduced.

That is, the cooling apparatus 7C includes the first fan 711, the second fan 721, the first loudspeaker 713 and the second loudspeaker 723 as a loudspeaker, the characteristic data storage section 751, and the control section 76C.

The first fan 711 causes the cooling gas to flow to the light source 30, which is a heat source, and the second fan 721 causes the cooling gas to flow to the image formation section 34, which is a heat source. The third fan 731 causes the cooling gas to flow to the power supply apparatus 4, which is a heat source, and the fourth fan 741 causes the cooling gas to flow to the control apparatus 5, which is a heat source. The first loudspeaker 713 and the second loudspeaker 723 output sound waves according to the inputted drive signals.

The first characteristic data storage section 7521 of the characteristic data storage section 751 stores the frequency characteristic data on the frequency characteristics of the first discharge-side noise (first noise) containing the discrete frequency noise produced by the driven first fan 711, the broadband noise based on the cooling gas flow generated by the driven first fan 711, and the in-apparatus environmental noise in accordance with the rotational speed of the first fan 711 per unit time. The second characteristic data storage section 7522 of the characteristic data storage section 751 stores the frequency characteristic data on the frequency characteristics of the second discharge-side noise (second noise) containing the discrete frequency noise produced by the driven second fan 721, the broadband noise based on the cooling gas flow generated by the driven second fan 721, and the in-apparatus environmental noise in accordance with the rotational speed of the second fan 721 per unit time.

The first characteristic data storage section 7531 of the characteristic data storage section 751 stores the frequency characteristic data on the frequency characteristics of the first intake-side noise (first noise) containing the discrete frequency noise produced by the driven first fan 711, the broadband noise based on the cooling gas flow generated by the driven first fan 711, and the in-apparatus environmental noise in accordance with the rotational speed of the first fan 711 per unit time. The second characteristic data storage section 7532 of the characteristic data storage section 751 stores the frequency characteristic data on the frequency characteristics of the second intake-side noise (second noise) containing the discrete frequency noise produced by the driven second fan 721, the broadband noise based on the cooling gas flow generated by the driven second fan 721, and the in-apparatus environmental noise in accordance with the rotational speed of the second fan 721 per unit time.

The control section 76C generates drive signals to be outputted to the first loudspeaker 713 and the second loudspeaker 723. The control section 76C includes the first characteristic acquisition section 764 and the second characteristic acquisition section 768 as the characteristic acquisition section, the first waveform generation section 766 and the second waveform generation section 770 as the waveform generation section, and the first signal output section 767 and the second signal output section 771 as the signal output section.

The first characteristic acquisition section 764 acquires the frequency characteristic data on the frequency characteristics of the first discharge-side noise (first noise) corresponding to the rotational speed of the first fan 711 per unit time from the first characteristic data storage section 7521. The first characteristic acquisition section 764 further acquires the frequency characteristic data on the frequency characteristics of the second discharge-side noise (second noise) corresponding to the rotational speed of the second fan 721 per unit time from the second characteristic data storage section 7522. The first characteristic acquisition section 764 still further acquires the frequency characteristic data on frequency characteristics of the third discharge-side noise (third noise) corresponding to the rotational speed of the third fan 731 per unit time and the frequency characteristic data on the frequency characteristics of the fourth discharge-side noise (fourth noise) corresponding to the rotational speed of the fourth fan 741 per unit time.

The first waveform generation section 766 generates the waveform of discharge-side interference sound, which interferes with the discharge-side noise containing the first to fourth discharge-side noise, based on the frequency characteristic data acquired by the first characteristic acquisition section 764.

The first signal output section 767 outputs a drive signal based on the waveform of the discharge-side interference sound generated by the first waveform generation section 766 to the first loudspeaker 713.

The second characteristic acquisition section 768 acquires the frequency characteristic data on the frequency characteristics of the first intake-side noise (first noise) corresponding to the rotational speed of the first fan 711 per unit time from the first characteristic data storage section 7531. The second characteristic acquisition section 768 further acquires the frequency characteristic data on the frequency characteristics of the second intake-side noise (second noise) corresponding to the rotational speed of the second fan 721 per unit time from the second characteristic data storage section 7532. The second characteristic acquisition section 768 still further acquires the frequency characteristic data on the frequency characteristics of the third intake-side noise (third noise) corresponding to the rotational speed of the third fan 731 per unit time and the frequency characteristic data on the frequency characteristics of the fourth intake-side noise (fourth noise) corresponding to the rotational speed of the fourth fan 741 per unit time.

The second waveform generation section 770 generates the waveform of the intake-side interference sound, which interferes with the intake-side noise containing the first to fourth discharge-side noise, based on the frequency characteristic data acquired by the second characteristic acquisition section 768.

The second signal output section 771 outputs a drive signal based on the waveform of the intake-side interference sound generated by the second waveform generation section 770 to the second loudspeaker 723.

The thus configured cooling apparatus 7C can provide the same effects as those provided by the projector 1C described above.

The cooling apparatus 7C of the projector 1C includes the rotational speed detection section 631 of the first detection section 712, which detects the rotational speed of the first fan 711 per unit time, and the rotational speed detection section 631 of the second detection section 722, which detects the rotational speed of the second fan 721 per unit time. The rotational speed detection section 631 of the first detection section 712 corresponds to a first rotational speed detection section, and the rotational speed detection section 631 of the second detection section 722 corresponds to a second rotational speed detection section.

The first characteristic acquisition section 764 acquires from the first characteristic data storage section 7521 the frequency characteristic data on the frequency characteristics of the first discharge-side noise corresponding to the rotational speed of the first fan 711 per unit time detected by the rotational speed detection section 631 of the first detection section 712 and acquires from the second characteristic data storage section 7522 the frequency characteristic data on the frequency characteristics of the second discharge-side noise corresponding to the rotational speed of the second fan 721 per unit time detected by the rotational speed detection section 631 of the second detection section 722.

The second characteristic acquisition section 768 acquires from the first characteristic data storage section 7531 the frequency characteristic data on the frequency characteristics of the first intake-side noise corresponding to the rotational speed of the first fan 711 per unit time detected by the rotational speed detection section 631 of the first detection section 712 and acquires from the second characteristic data storage section 7532 the frequency characteristic data on the frequency characteristics of the second intake-side noise corresponding to the rotational speed of the second fan 721 per unit time detected by the rotational speed detection section 631 of the second detection section 722.

According to the configuration described above, the first characteristic acquisition section 764 can acquire the frequency characteristic data on the frequency characteristics of the first discharge-side noise according to the actual rotational speed of the first fan 711 per unit time and the frequency characteristic data on the frequency characteristics of the second discharge-side noise according to the actual rotational speed of the second fan 721 per unit time. Therefore, the waveform of the first discharge-side noise and the waveform of the second discharge-side noise can be reproduced more accurately, and in turn, the discharge-side interference sound, which effectively interferes with the discharge-side noise containing the first discharge-side noise and the second discharge-side noise, can be emitted from the first loudspeaker 713. The discharge-side noise emitted out of the projector 1C can therefore be effectively reduced.

The second characteristic acquisition section 768 can acquire the frequency characteristic data on the frequency characteristics of the first intake-side noise according to the actual rotational speed of the first fan 711 per unit time and the frequency characteristic data on the frequency characteristics of the second intake-side noise according to the actual rotational speed of the second fan 721 per unit time. The intake-side noise emitted out of the projector 1C can therefore be effectively reduced in the same manner described above.

The cooling apparatus 7C of the projector 1C includes the rotational position detection section 632 of the first detection section 712, which detects the rotational position of the first fan 711, the rotational position detection section 632 of the second detection section 722, which detects the rotational position of the second fan 721, and the phase data storage section 754. The rotational position detection section 632 of the first detection section 712 corresponds to a first rotational position detection section, and the rotational position detection section 632 of the second detection section 722 corresponds to a second rotational position detection section.

The first phase data storage section 7551 of the phase data storage section 754 stores the phase data (first phase data) representing the phases of the plurality of frequency components contained in the first discharge-side noise in accordance with the rotational position of the first fan 711. The second phase data storage section 7552 of the phase data storage section 754 stores the phase data (second phase data) representing the phases of the plurality of frequency components contained in the second discharge-side noise in accordance with the rotational position of the second fan 721.

The first phase data storage section 7561 of the phase data storage section 754 stores the phase data (first phase data) representing the phases of the plurality of frequency components contained in the first intake-side noise in accordance with the rotational position of the first fan 711. The second phase data storage section 7562 of the phase data storage section 754 stores the phase data (second phase data) representing the phases of the plurality of frequency components contained in the second intake-side noise in accordance with the rotational position of the second fan 721.

In the control section 76C, the first phase acquisition section 765 as a phase acquisition section acquires the phase data (first phase data) corresponding to the detected rotational position of the first fan 711 from the first phase data storage section 7551 and acquires the phase data (second phase data) corresponding to the detected rotational position of the second fan 721 from the second phase data storage section 7552. The first waveform generation section 766 generates the waveform of the discharge-side interference sound based on the frequency characteristic data on the frequency characteristics of the first discharge-side noise and the frequency characteristic data on the frequency characteristics of the second discharge-side noise acquired by the first characteristic acquisition section 764 and the phase data acquired by the first phase acquisition section 765.

Similarly, the second phase acquisition section 769 as the phase acquisition section acquires the phase data (first phase data) corresponding to the detected rotational position of the first fan 711 from the first phase data storage section 7561 and acquires the phase data (second phase data) corresponding to the detected rotational position of the second fan 721 from the second phase data storage section 7562. The second waveform generation section 770 generates the waveform of the intake-side interference sound based on the frequency characteristic data on the frequency characteristics of the first intake-side noise and the frequency characteristic data on the frequency characteristics of the second intake-side noise acquired by the second characteristic acquisition section 768 and the phase data acquired by the second phase acquisition section 769.

According to the configuration described above, the phase acquisition sections 765 and 769 acquire the phase data according to the rotational position of the first fan 711 and the phase data according to the rotational position of the second fan 721, respectively. The phase acquisition sections 765 and 769 further acquire the phase data according to the rotational position of the third fan 731 and the phase data according to the rotational position of the fourth fan 741, respectively. Thereafter, the first waveform generation section 766 generates the waveform of the discharge-side interference sound based on the frequency characteristic data on the frequency characteristics of the first discharge-side noise, the frequency characteristic data on the frequency characteristics of the second discharge-side noise, and the phase data, and the second waveform generation section 770 generates the waveform of the intake-side interference sound based on the frequency characteristic data on the frequency characteristics of the first intake-side noise, the frequency characteristic data on the frequency characteristics of the second intake-side noise, and the phase data.

The discharge-side interference sound, which can effectively reduce the discharge-side noise containing the first discharge-side noise and the second discharge-side noise, can thus be emitted from the first loudspeaker 713, as in the projectors 1A and 1B according to the first and second embodiments described above. Furthermore, the intake-side interference sound, which can effectively reduce the intake-side noise containing the first intake-side noise and the second intake-side noise, can be emitted from the second loudspeaker 723. The two types of noise can therefore be effectively reduced.

In the cooling apparatus 7C of the projector 1C, the frequency characteristic data on the frequency characteristics of the first discharge-side noise is data representing the features of each of the plurality of frequency components contained in the first discharge-side noise and formed of the frequency and sound pressure of each of the frequency components. The frequency characteristic data on the frequency characteristics of the second discharge-side noise is data representing the features of each of the plurality of frequency components contained in the second discharge-side noise and formed of the frequency and sound pressure of each of the frequency components. The same holds true for the frequency characteristic data on the frequency characteristics of the first intake-side noise and the frequency characteristic data on the frequency characteristics of the second intake-side noise.

According to the configuration described above, the discharge-side interference sound and the intake-side interference sound, which can effectively reduce at least one frequency component contained in the discharge-side noise and the intake-side noise, can be emitted from the loudspeakers 713 and 723, as in the projectors 1A and 1B according to the first and second embodiments described above.

The discharge-side noise and the intake-side noise can therefore be effectively reduced.

In the cooling apparatus 7C of the projector 1C, the first fan 711 causes the cooling gas to flow to the light source 30 as a first heat source out of the heat sources, and the second fan 721 causes the cooling gas to flow to the image formation section 34 as a second heat source out of the heat sources. The third fan 731 causes the cooling gas to flow to the power supply apparatus 4 out of the heat sources, and the fourth fan 741 causes the cooling gas to flow to the control apparatus 5 out of the heat sources.

According to the configuration described above, in which the cooling gas flows to each of the heat sources, the heat sources can each be cooled efficiently.

The control method executed by the control section 76C is executed in the projector 1C, which is an electronic instrument including the first fan 711 and the second fan 721, which cause the cooling gas to flow to the light source 30 and the image formation section 34, which are heat sources, and the first loudspeaker 713 and the second loudspeaker 723, which each output a sound wave according to a drive signal inputted to the loudspeaker. The control method acquires the frequency characteristic data on the frequency characteristics of the first discharge-side noise (first noise) containing the discrete frequency noise produced by the driven first fan 711, the broadband noise based on the cooling gas flow generated by the driven first fan 711, and the in-apparatus environmental noise in accordance with the rotational speed of the first fan 711 per unit time.

The control method acquires the frequency characteristic data on the frequency characteristics of the second discharge-side noise (second noise) containing the discrete frequency noise produced by the driven second fan 721, the broadband noise based on the cooling gas flow generated by the driven second fan 721, and the in-apparatus environmental noise in accordance with the rotational speed of the second fan 721 per unit time. The control method then, based on the acquired frequency characteristic data on the frequency characteristics of the first discharge-side noise and the acquired frequency characteristic data on the frequency characteristics of the second discharge-side noise, generates the waveform of the discharge-side interference sound, which interferes with the discharge-side noise containing the first discharge-side noise and the second discharge-side noise, and outputs a drive signal based on the generated waveform of the discharge-side interference sound to the first loudspeaker 713.

The control method executed by the control section 76C uses the same procedure of the control method described above to generate the waveform of the intake-side interference sound, which interferes with the intake-side noise containing the first intake-side noise and the second intake-side noise, and output a drive signal based on the generated waveform of the intake-side interference sound to the second loudspeaker 723.

According to the configuration described above, the same effects as those provided by the projector 1C or the cooling apparatus 7C described above can be provided.

Fourth Embodiment

A fourth embodiment of the present disclosure will next be described.

The projector according to the present embodiment has the same configuration as that of the projector 1C according to the third embodiment, but differs therefrom in that the fans 711, 721, 731, and 741 are formed of fans having the same specifications, and that the control section causes the fans 711, 721, 731, and 741 to operate at the same fan rotational speed and to have the same rotational position. In the following description, portions that are the same or substantially the same as the portions having been already described have the same reference characters and will not be described.

Configuration of Projector

Figure 10:
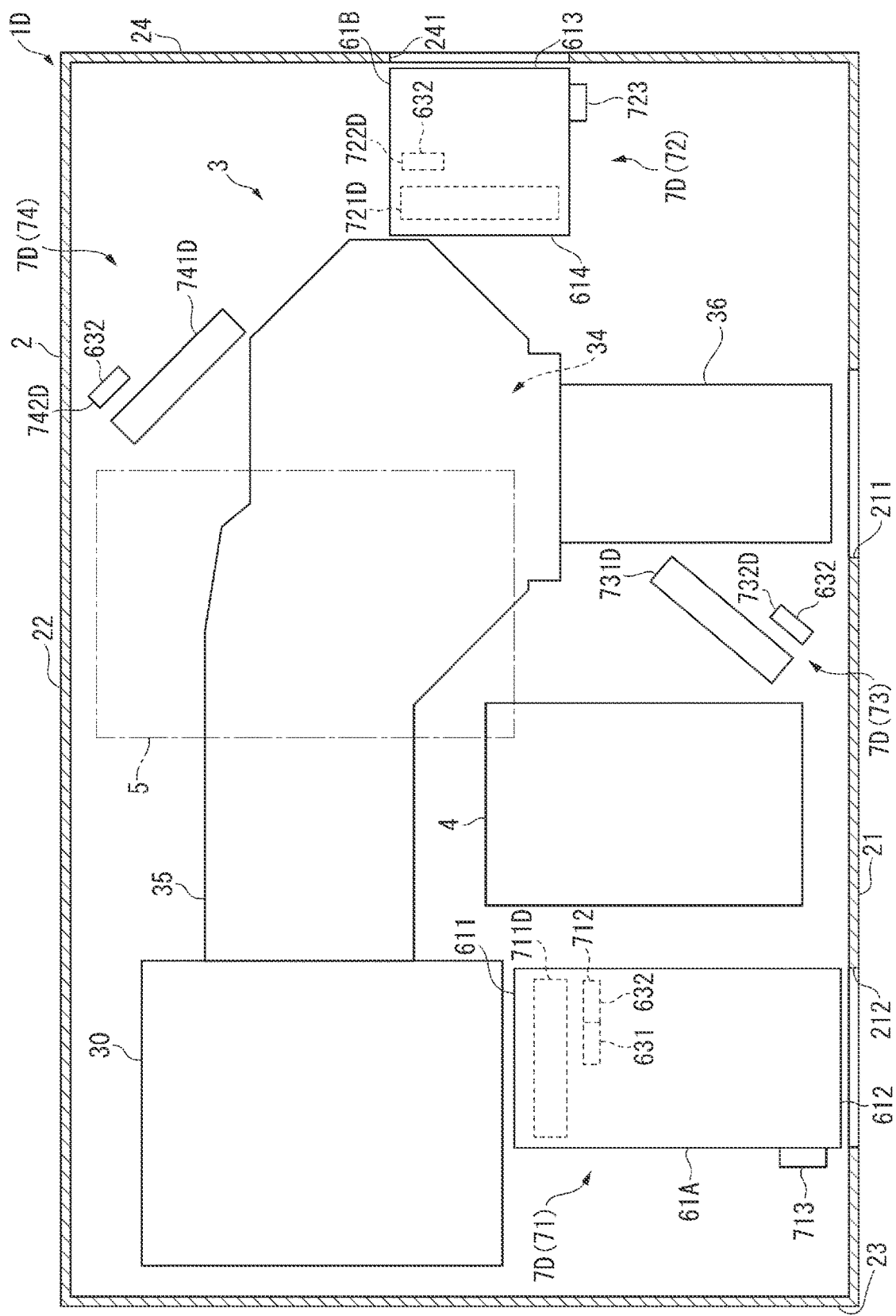
FIG. 10 is a diagrammatic view showing the configuration of the projector according to a fourth embodiment.

FIG. 10 is a diagrammatic view showing the configuration of a projector 1D according to the present embodiment.

The projector 1D according to the present embodiment has the same configuration and function as those of the projector 1C according to the third embodiment except that the cooling apparatus 7C according to the third embodiment is replaced with a cooling apparatus 7D shown in FIG. 10.

Configuration of Cooling Apparatus

The cooling apparatus 7D has the same configuration and function as those in the projector 1C according to the third embodiment except that the fans 711, 721, 731, and 741, the detection sections 722, 732, and 742, and the control section 76C are replaced with fans 711D, 721D, 731D, and 741D, detection sections 722D, 732D, and 742D, and a control section 76D.

The first fan 711D sucks the cooling gas in the exterior enclosure 2 and causes the cooling gas to flow to the light source 30, which is a heat source, as the first fan 711 does.

The second fan 721D sucks the air outside the exterior enclosure 2 as the cooling gas and sends the cooling gas to the image formation section 34, which is a heat source, to cause the cooling gas to flow to the image formation section 34, as the second fan 721 does.

The third fan 731D sucks the cooling gas in the exterior enclosure 2 and sends the cooling gas to the power supply apparatus 4, which is a heat source, to cause the cooling gas to flow to the power supply apparatus 4, as the third fan 731 does.

The fourth fan 741D sucks the cooling gas in the exterior enclosure 2 and sends the cooling gas to the control apparatus 5, which is a heat source, to cause the cooling gas to flow to the control apparatus 5, as the fourth fan 741 does.

The fans 711D, 721D, 731D, and 741D have the same specifications and are driven by the control section 76D at the same fan rotational speed. Fans having the same specifications are fans having the same dimensions and the same number of vanes.

The cooling apparatus 7D includes the first detection section 712, the second detection section 722D, the third detection section 732D, and the fourth detection section 742D, as described above.

The second detection section 722D includes the rotational position detection section 632, which detects the rotational position of the second fan 721D, but does not include the rotational speed detection section 631, which detects the fan rotational speed of the second fan 721D. The third detection section 732D includes the rotational position detection section 632, which detects the rotational position of the third fan 731D, but does not include the rotational speed detection section 631, which detects the fan rotational speed of the third fan 731D. The fourth detection section 742D includes the rotational position detection section 632, which detects the rotational position of the fourth fan 741D, but does not include the rotational speed detection section 631, which detects the fan rotational speed of the fourth fan 741D.

On the other hand, the first detection section 712 includes not only the rotational position detection section 632, which detects the rotational position of the first fan 711D, but also the rotational speed detection section 631, which detects the fan rotational speed of the first fan 711D.

Configuration of Control Section

Figure 11:
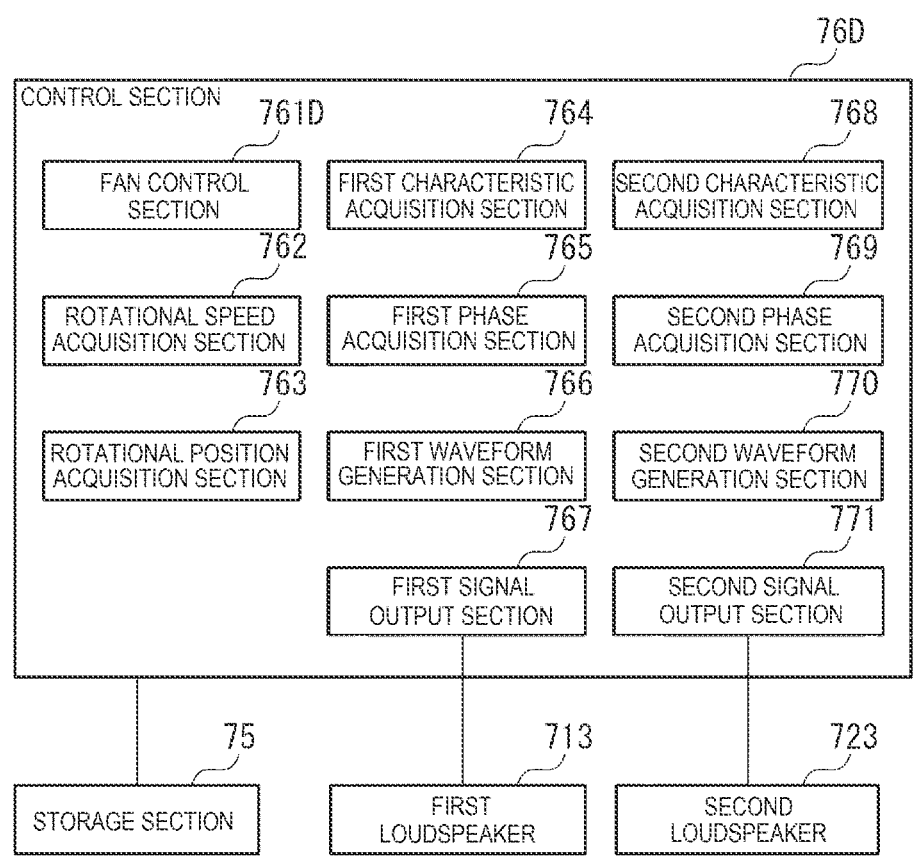
FIG. 11 is a block diagram showing the configuration of the control section according to the fourth embodiment.

FIG. 11 is a block diagram showing the configuration of the control section 76D.

The control section 76D controls the operation of the cooling apparatus 7D based on control signals inputted from the control apparatus 5, as the control section 76C does. The control section 76D has the same configuration and function as those of the control section 76C according to the third embodiment except that the fan control section 761 according to the third embodiment is replaced with a fan control section 761D, as shown in FIG. 11.

That is, the control section 76D includes the fan control section 761D, the rotational speed acquisition section 762, the rotational position acquisition section 763, the first characteristic acquisition section 764, the first phase acquisition section 765, the first waveform generation section 766, the first signal output section 767, the second characteristic acquisition section 768, the second phase acquisition section 769, the second waveform generation section 770, and the second signal output section 771.

The fan control section 761D of the control section 76D operates the fans 711D, 721D, 731D, and 741D based on a control signal inputted from the control apparatus 5. In this process, the control apparatus 5 outputs a control signal that drives the fans 711D, 721D, 731D, and 741D at the same fan rotational speed to the control section 76D.

To this end, the fan control section 761D applies the same fan voltage to the fans 711D, 721D, 731D, and 741D. The fans 711D, 721D, 731D, and 741D are thus driven at the same fan rotational speed.

The fan control section 761D rotates the fans 711D, 721D, 731D, and 741D with the rotational positions thereof aligned with one another. Specifically, the fan control section 761D aligns the rotational positions of the second fan 721D, the third fan 731D, and the fourth fan 741D with the rotational position of the first fan 711D based on the result of detection performed by the rotational position detection section 632 of each of the detection sections 712, 722D, 732D, and 742D.

In this process, the fan control section 761D may sequentially align the rotational positions of the second fan 721D, third fan 731D, and fourth fan 741D with the rotational position of the first fan 711D or all at once.

The fan control section 761D aligns the fan rotational speeds of the fans 721D, 731D, and 741D with the fan rotational speed of the fan 711D as described above, eliminating the need to provide the rotational speed detection sections 631 that detect the fan rotational speeds of the fans 721D, 731D, and 741D.

When the rotational positions of the fans 711D, 721D, 731D, and 741D are aligned with one another, the discharge-side noise and the intake-side noise leaking out of the projector 1D can be reduced, for example, even when the discharge-side phase data storage section 755 and the intake-side phase data storage section 756 store in accordance with the fan rotational speed only the phase data on the phases of the fans 711D, 721D, 731D, and 741D provided when the rotational positions thereof are a predetermined position (reference position, for example), by outputting drive signals based on the discharge-side interference sound and the intake-side interference sound at the timing when the rotational positions of the fans 711D, 721D, 731D, and 741D become the predetermined position to the first loudspeaker 713 and the second loudspeaker 723.

In other words, the fan control section 761D aligns the fan rotational speeds and rotational positions of the fans 721D, 731D, and 741D with the fan rotational speed and the rotational position of the fan 711 to reduce the storage capacities of the discharge-side phase data storage section 755 and the intake-side phase data storage section 756.

Effects of Fourth Embodiment

The projector 1D according to the present embodiment described above provides the effects below as well as the same effects as those provided by the projector 1C according to the third embodiment described above.

The projector 1D includes the exterior enclosure 2, the light source 30, the image formation section 34, the first fan 711D, the second fan 721D, the first loudspeaker 713, the second loudspeaker 723, the characteristic data storage section 751, and the control section 76D.

The exterior enclosure 2 has the intake port 241 and the discharge port 212. The light source 30 and the image formation section 34 are heat sources disposed in the exterior enclosure 2. The first fan 711D causes the cooling gas to flow to the light source 30. The second fan 721D has the same specifications as those of the first fan 711D and causes the cooling gas to flow to the image formation section 34. The first loudspeaker 713 is disposed between the discharge port 212 and the first fan 711D, which is disposed in a position closer to the discharge port 212, out of the first fan 711D and the second fan 721D, in the channel of the cooling gas, and outputs a sound wave according to a drive signal inputted to the first loudspeaker 713. The second loudspeaker 723 is disposed between the intake port 241 and the second fan 721D, which is disposed in a position closer to the intake port 241, out of the first fan 711D and the second fan 721D, in the channel of the cooling gas, and outputs a sound wave according to a drive signal inputted to the second loudspeaker 723.

The first characteristic data storage section 7521 of the characteristic data storage section 751 stores the frequency characteristic data on the frequency characteristics of the first discharge-side noise containing the discrete frequency noise produced by the driven first fan 711D, the broadband noise based on the cooling gas flow generated by the driven first fan 711D, and the in-apparatus environmental noise in accordance with the rotational speed of the first fan 711D per unit time. The second characteristic data storage section 7522 of the characteristic data storage section 751 stores the frequency characteristic data on the frequency characteristics of the second discharge-side noise containing the discrete frequency noise produced by the driven second fan 721D, the broadband noise based on the cooling gas flow generated by the driven second fan 721D, and the in-apparatus environmental noise in accordance with the rotational speed of the second fan 721D per unit time.

The first characteristic data storage section 7531 of the characteristic data storage section 751 stores the frequency characteristic data on the frequency characteristics of the first intake-side noise containing the discrete frequency noise produced by the driven first fan 711D, the broadband noise based on the cooling gas flow generated by the driven first fan 711D, and the in-apparatus environmental noise in accordance with the rotational speed of the first fan 711D per unit time. The second characteristic data storage section 7532 of the characteristic data storage section 751 stores the frequency characteristic data on the frequency characteristics of the second intake-side noise containing the discrete frequency noise produced by the driven second fan 721D, the broadband noise based on the cooling gas flow generated by the driven second fan 721D, and the in-apparatus environmental noise in accordance with the rotational speed of the second fan 721D per unit time.

The control section 76D generates drive signals to be outputted to the first loudspeaker 713 and the second loudspeaker 723. The control section 76D includes the fan control section 761D, the first characteristic acquisition section 764 and the second characteristic acquisition section 768 as the characteristic acquisition section, the first waveform generation section 766 and the second waveform generation section 770 as the waveform generation section, and the first signal output section 767 and the second signal output section 771 as the signal output section.

The fan control section 761D drives the first fan 711D and the second fan 721D at the same rotational speed per unit time. The effects of the first characteristic acquisition section 764, the first waveform generation section 766, the first signal output section 767, the second characteristic acquisition section 768, the second waveform generation section 770, and the second signal output section 771 are the same as those in the third embodiment described above.

That is, the cooling apparatus 7D includes the first fan 711D, the second fan 721D, the first loudspeaker 713, the second loudspeaker 723, the characteristic data storage section 751, and the control section 76D.

The first fan 711D causes the cooling gas to flow to the light source 30. The second fan 721D has the same specifications as those of the first fan 711D and causes the cooling gas to flow to the image formation section 34.

The first loudspeaker 713 and the second loudspeaker 723 output sound waves according to the inputted drive signals. The first characteristic data storage section 7521 and the second characteristic data storage section 7522 of the characteristic data storage section 751, the first characteristic data storage section 7531 and the second characteristic data storage section 7532 of the characteristic data storage section 751, and the control section 76D are the same as those in the description of the projector 1C.

According to the configuration described above, the control section 76D allows the discharge-side interference sound to be emitted from the first loudspeaker 713 with no need for a microphone that detects the discharge-side noise containing the first discharge-side noise and the second discharge-side noise, as in the projector 1C and the cooling apparatus 7C according to the third embodiment described above.

The control section 76D further allows the intake-side interference sound to be emitted from the second loudspeaker 723 with no need for a microphone that detects the intake-side noise containing the first intake-side noise and the second intake-side noise.

Since the first discharge-side noise and the second discharge-side noise each contain the discrete frequency noise, the broadband noise, and the in-apparatus environmental noise, the range of the noise reduced by emitting the discharge-side interference sound can be expanded.

Similarly, since the first intake-side noise and the second intake-side noise each contain the discrete frequency noise, the broadband noise, and the in-apparatus environmental noise, the range of the noise reduced by emitting the intake-side interference sound can be expanded. Therefore, the configuration of the projector 1D can be simplified, and the discharge-side noise and the intake-side noise can be effectively reduced.

Furthermore, since the fan control section 761D drives the first fan 711D, the second fan 721D, the third fan 731D, and the fourth fan 741D at the same rotational speed per unit time, there is no need to detect the rotational speeds of the fans other than the first fan 711D per unit time. Therefore, the configuration of the projector 1D can be simplified, and the process of outputting the discharge-side interference sound and the intake-side interference sound can be simplified.

The cooling apparatus 7D of the projector 1D includes the rotational speed detection section 631, which detects the rotational speed of the first fan 711D per unit time out of the first fan 711D and the second fan 721D. The first characteristic acquisition section 764 acquires the frequency characteristic data representing the frequency characteristics of the first discharge-side noise and corresponding to the rotational speed detected by the rotational speed detection section 631 and the frequency characteristic data representing the frequency characteristics of the second discharge-side noise and corresponding to the rotational speed detected by the rotational speed detection section 631. Similarly, the second characteristic acquisition section 768 acquires the frequency characteristic data representing the frequency characteristics of the first intake-side noise and corresponding to the rotational speed detected by the rotational speed detection section 631 and the frequency characteristic data representing the frequency characteristics of the second intake-side noise and corresponding to the rotational speed detected by the rotational speed detection section 631. The same applies to the acquisition of the frequency characteristic data on the frequency characteristics of each of the third discharge-side noise, the fourth discharge-side noise, the third intake-side noise, and the fourth intake-side noise.

As described above, since the fans 711D, 721D, 731D, and 741D are driven at the same rotational speed per unit time, the actual rotational speeds of the fans 711D, 721D, 731D, and 741D per unit time can be detected by detecting the rotational speed of the first fan 711D per unit time. There is therefore no need to provide each of the fans 711D, 721D, 731D, and 741D with the rotational speed detection section 631.

Since the first characteristic acquisition section 764 and the second characteristic acquisition section 768 can acquire the frequency characteristic data according to the actual fan rotational speeds of the fans 711D, 721D, 731D, and 741D, the waveforms of the discharge-side noise and the intake-side noise can be reproduced more accurately. The discharge-side interference sound and the intake-side interference sound, which effectively interfere with the discharge-side noise and the intake-side noise, can therefore be emitted from the first loudspeaker 713 and the second loudspeaker 723, whereby the noise emitted out of the projector 1D can be effectively reduced.

The cooling apparatus 7D of the projector 1D includes the rotational position detection section 632 of the first detection section 712, which detects the rotational position of the first fan 711D, the rotational position detection section 632 of the second detection section 722, which detects the rotational position of the second fan 721D, and the phase data storage section 754.

The first phase data storage section 7551 of the phase data storage section 754 stores the first phase data representing the phases of the plurality of frequency components contained in the first discharge-side noise in accordance with the rotational speed and the rotational position of the first fan 711D. The second phase data storage section 7552 of the phase data storage section 754 stores the second phase data representing the phases of the plurality of frequency components contained in the second discharge-side noise in accordance with the rotational speed and the rotational position of the second fan 721D. The same applies to the third phase data storage section 7553 and the fourth phase data storage section 7554.

The first phase data storage section 7561 of the phase data storage section 754 stores the first phase data representing the phases of the plurality of frequency components contained in the first intake-side noise in accordance with the rotational speed and the rotational position of the first fan 711D. The second phase data storage section 7562 of the phase data storage section 754 stores the second phase representing the phases of the plurality of frequency components contained in the second intake-side noise in accordance with the rotational speed and the rotational position of the second fan 721D. The same applies to the third phase data storage section 7563 and the fourth phase data storage section 7564.

The fan control section 761D drives the first fan 711D and the second fan 721D in synchronization with each other in such a way that the rotational position of the first fan 711D coincides with the rotational position of the second fan 721D. The control section 76D includes the first phase acquisition section 765 and the second phase acquisition section 769 as the phase acquisition section.

The first phase acquisition section 765 acquires the phase data corresponding to the rotational position of the first fan 711D from the first phase data storage section 7551 and the phase data corresponding to the rotational position of the first fan 711D from the second phase data storage section 7552.

The second phase acquisition section 769 acquires the phase data corresponding to the rotational position of the first fan 711D from the first phase data storage section 7561 and the phase data corresponding to the rotational position of the first fan 711D from the second phase data storage section 7562.

The first waveform generation section 766 generates the waveform of the discharge-side interference sound based on the frequency characteristic data on the frequency characteristics of the first discharge-side noise and the frequency characteristic data on the frequency characteristics of the second discharge-side noise acquired by the first characteristic acquisition section 764 and the phase data acquired by the first phase acquisition section 765.

The second waveform generation section 770 generates the waveform of the intake-side interference sound based on the frequency characteristic data on the frequency characteristics of the first intake-side noise and the frequency characteristic data on the frequency characteristics of the second intake-side noise acquired by the second characteristic acquisition section 768 and the phase data acquired by the second phase acquisition section 769.

According to the configuration described above, the fan control section 761D drives the fans 711D, 721D, 731D, and 741D in synchronization with one another in such a way that the fans have the same rotational position.

The rotational positions of the fans 711D, 721D, 731D, and 741D can therefore be acquired by the rotational position detection section 632 through detection of the rotational position of one of the fans. Therefore, the configuration of the projector 1D can be simplified, and the interference sound outputting process can be simplified.

Thereafter, the first phase acquisition section 765 acquires the phase data according to the rotational positions of the fans 711D, 721D, 731D, and 741D, and the first waveform generation section 766 generates the waveform of the discharge-side interference sound based on the frequency characteristic data on the frequency characteristics of each discharge-side noise and the phase data on the phase thereof.

Similarly, the second phase acquisition section 769 acquires the phase data according to the rotational positions of the fans 711D, 721D, 731D, and 741D, and the second waveform generation section 770 generates the waveform of the intake-side interference sound based on the frequency characteristic data on the frequency characteristics of each intake-side noise and the phase data on the phase thereof.

The discharge-side interference sound and the intake-side interference sound that can effectively reduce the discharge-side noise and the intake-side noise can thus be emitted from the first loudspeaker 713 and the second loudspeaker 723. The two types of noise can therefore be effectively reduced.

The control method executed by the control section 76D is executed in the projector 1D, which is an electronic instrument including the first fan 711D, which causes the cooling gas to flow to the light source 30, which is a heat source, the second fan 721D, which has the same specifications as those of the first fan 711D and causes the cooling gas to flow to the image formation section 34, which is a heat source, and the first loudspeaker 713 and the second loudspeaker 723, which each output a sound wave according to a drive signal inputted to the loudspeaker.

In the control method, the fans 711D and 721D are driven at the same rotational speed per unit time. The control method then acquires the frequency characteristic data on the frequency characteristics of the first discharge-side noise containing the discrete frequency noise produced by the driven first fan 711D, the broadband noise based on the cooling gas flow generated by the driven first fan 711D, and the in-apparatus environmental noise in accordance with the rotational speed of the first fan 711D per unit time.

The control method further acquires the frequency characteristic data on the frequency characteristics of the second discharge-side noise containing the discrete frequency noise produced by the driven second fan 721D, the broadband noise based on the cooling gas flow generated by the driven second fan 721D, and the in-apparatus environmental noise in accordance with the rotational speed of the second fan 721D per unit time.

The control method then, based on the acquired frequency characteristic data on the frequency characteristics of the first discharge-side noise and the frequency characteristic data on the frequency characteristics of the second discharge-side noise, generates the waveform of the discharge-side interference sound, which interferes with the discharge-side noise containing the first discharge-side noise and the second discharge-side noise, and outputs a drive signal based on the generated waveform of the discharge-side interference sound to the first loudspeaker 713.

The control method described above further acquires the frequency characteristic data on the frequency characteristics of the first intake-side noise containing the discrete frequency noise produced by the driven first fan 711D, the broadband noise based on the cooling gas flow generated by the driven first fan 711D, and the in-apparatus environmental noise in accordance with the rotational speed of the first fan 711D per unit time.

The control method further acquires the frequency characteristic data on the frequency characteristics of the second intake-side noise containing the discrete frequency noise produced by the driven second fan 721D, the broadband noise based on the cooling gas flow generated by the driven second fan 721D, and the in-apparatus environmental noise in accordance with the rotational speed of the second fan 721D per unit time.

The control method then, based on the acquired frequency characteristic data on the frequency characteristics of the first intake-side noise and the frequency characteristic data on the frequency characteristics of the second intake-side noise, generates the waveform of the intake-side interference sound, which interferes with the intake-side noise containing the first intake-side noise and the second intake-side noise, and outputs a drive signal based on the generated waveform of the intake-side interference sound to the second loudspeaker 723.

According to the configuration described above, the same effects as those provided by the projector 1D and the cooling apparatus 7D can be provided by executing the control method described above.

Variations of Embodiments

The present disclosure is not limited to the embodiments described above, and variations, improvements, and other modifications to the extent that the advantage of the present disclosure is achieved fall within the scope of the present disclosure.

In the first and second embodiments described above, the cooling apparatuses 6A and 6B of the projectors 1A and 1B each include a single fan. In the third and fourth embodiments described above, the cooling apparatuses 7C and 7D of the projectors 1C and 1D each include four fans. The number of fans provided in each of the cooling apparatuses is not limited to one or four and may be changed as appropriate.

In the first embodiment described above, the light source 30 is presented as a heat source to which the cooling gas is caused to flow, and in the second embodiment described above, the image forming section 34 is presented as a heat source to which the cooling gas is caused to flow. In the third and fourth embodiments described above, the light source 30, the image formation section 34, the power supply apparatus 4, and the control apparatus 5 are presented as heat sources to which the cooling gas is caused to flow.

The heat sources are not limited to those described above and may be other components. For example, in the projector 1A shown in the first embodiment described above, the heat source to which the cooling gas is caused to flow by the fan may be a component other than the light source 30.

In each of the embodiments described above, the cooling apparatus includes the rotational speed detection section 631, which detects the rotational speed of the fan (fan rotational speed) per unit time, but not necessarily.

For example, when the fan control sections 661, 761, and 761D can accurately grasp and set the fan rotational speed of the driven fan from the fan voltage or any other factor, the cooling apparatus may not include the rotational speed detection section 631.

In each of the embodiments described above, the cooling apparatus includes the rotational position detection section 632, which detects the rotational position of the fan, but not necessarily.

The cooling apparatus may not necessarily include the rotational position detection section 632.

In each of the embodiments described above, for example, the frequency characteristic data is data representing the frequency and the sound pressure of each of a plurality of frequency components contained in the noise.

The content of the frequency characteristic data is, however, not limited to the frequency and the sound pressure. For example, the frequency characteristic data may be expressed by a numerical formula or any other form.

In each of the embodiments described above, the noise having a reduced sound pressure as a result of interference with an interference sound is noise containing discrete frequency noise produced by the driven fan, broadband noise based on the cooling gas flow generated by the driven fan, and in-apparatus environmental noise.

The interference sound may be interference sound that interferes with part of the frequency components contained in the noise.

For example, the interference sound may be sound that reduces part of the discrete frequency noise, the broadband noise, and the in-apparatus environmental noise, that is, noise that belongs to any of a low frequency band, an intermediate frequency band, and a high frequency band.

In each of the embodiments described above, the projectors 1A, 1B, 1C, and 1D each include the three light modulators 343R, 343G, and 343B, but not necessarily. The present disclosure is also applicable to a projector including two or less or four or more light modulators.

In each of the embodiments described above, the image projection apparatus 3 includes the optical parts arranged as shown in the layout diagram of FIG. 1.

The optical parts provided in the image projection apparatus 3 and the layout thereof are not limited to those described above.

The overall layout of the projector can also be changed as appropriate. For example, at least one of the duct 61A provided in association with the discharge port 212 and the duct 61B provided in association with the intake port 241 may be omitted.

In each of the embodiments described above, the light modulators 343 are each a transmissive liquid crystal panel having a light incident surface and a light exiting surface different from each other, but not necessarily.

The light modulators may each be a reflective liquid crystal panel having a surface that serves both as the light incident surface and the light exiting surface.

Furthermore, a light modulator using any component other than a liquid-crystal-based component and capable of modulating an incident luminous flux to form an image according to image information, such as a device using micromirrors, for example, a digital micromirror device (DMD), may be employed.

The embodiments described above have been presented with reference to the case where the cooling apparatuses 6A, 6B, 7C, and 7D according to the present disclosure are used for the projectors 1A, 1B, 1C, and 1D, but not necessarily. The electronic instrument for which any of the cooling apparatuses according to the present disclosure is used may be electronic instruments other than projectors. The cooling apparatuses according to the present disclosure may also be each used as a stand-alone electronic instrument.

Overview of Present Disclosure

The present disclosure will be summarized below as additional remarks.

A projector according to a first aspect of the present disclosure includes an exterior enclosure having an intake port and a discharge port, a heat source disposed in the exterior enclosure, a fan that causes a cooling gas to flow to the heat source, a loudspeaker that is disposed between one of the two openings, the intake port and the discharge port, and the fan in the channel of the cooling gas and outputs a sound wave according to a drive signal inputted to the loudspeaker, a characteristic data storage section that stores frequency characteristic data on the frequency characteristics of first noise containing discrete frequency noise produced by the driven fan, broadband noise based on the flow of the cooling gas generated by the driven fan, and in-apparatus environmental noise in accordance with the rotational speed of the fan per unit time, and a control section that generates the drive signal to be outputted to the loudspeaker.

The control section includes a characteristic acquisition section that acquires the frequency characteristic data corresponding to the rotational speed of the fan per unit time from the characteristic data storage section, a waveform generation section that generates the waveform of an interference sound that interferes with the first noise leaking out of the exterior enclosure via the one opening based on the frequency characteristic data acquired by the characteristic acquisition section, and a signal output section that outputs the drive signal based on the waveform generated by the waveform generation section to the loudspeaker.

According to the configuration described above, in which the characteristic acquisition section acquires the frequency characteristic data corresponding to the rotational speed of the fan per unit time from the characteristic data storage section, the control section can acquire the frequency characteristics of the first noise leaking out of the exterior enclosure.

The waveform generation section then generates the waveform of the interference sound, which interferes with the first noise, and the signal output section outputs a drive signal based on the generated waveform of the interference sound to the loudspeaker, whereby the interference sound, which interferes with the first noise, can be emitted from the loudspeaker without no need for a microphone that detects the first noise.

The configuration of the projector can therefore be simplified. In addition, since the first noise contains the discrete frequency noise, the broadband noise, and the in-apparatus environmental noise, the range of reducible noise can be expanded.

In the first aspect described above, the projector may include a rotational speed detection section that detects the rotational speed of the fan per unit time, and the characteristic acquisition section may acquire the frequency characteristic data corresponding to the rotational speed of the fan per unit time detected by the rotational speed detection section.

According to the configuration described above, the characteristic acquisition section can acquire the frequency characteristic data corresponding to the actual rotational speed of the fan per unit time and can therefore more accurately reproduce the waveform of the first noise, and the loudspeaker can in turn emit the interference sound, which effectively interferes with the first noise.

The first noise emitted out of the projector can therefore be effectively reduced.

In the first aspect described above, the projector includes a rotational position detection section that detects the rotational position of the fan, and a phase data storage section that stores phase data representing the phases of a plurality of frequency components contained in the first noise in accordance with the rotational speed of the fan per unit time and the rotational position of the fan.

The control section may include a phase acquisition section that acquires from the phase data storage section the phase data corresponding to the rotational position of the fan detected by the rotational position detection section, and the waveform generation section may generate the waveform of the interference sound based on the frequency characteristic data acquired by the characteristic acquisition section and the phase data acquired by the phase acquisition section.

It is noted that the first noise can be efficiently reduced by causing interference sound opposite in terms of phase from the first noise to be interfered with the first noise. On the other hand, the phases of the plurality of frequency components contained in the first noise are hardly aligned with each other.

In contrast, the phase data storage section stores the phases of plurality of frequency components contained in the first noise in accordance with the rotational position of the fan.

As described above, the phase acquisition section acquires the phase data according to the rotational position of the fan detected by the rotational position detection section, and the waveform generation section generates the waveform of the interference sound based on the frequency characteristic data acquired by the characteristic acquisition section and the phase data acquired by the phase acquisition section, whereby the interference sound, which can effectively reduce the first noise, can be emitted from the loudspeaker. The first noise can therefore be effectively reduced.

In the first aspect described above, the frequency characteristic data may be data representing the features of at least one of the plurality of frequency components contained in the first noise.

According to the configuration described above, based on the features of the frequency components indicated by the frequency characteristic data, the interference sound that can interfere with at least one frequency component contained in the first noise to effectively reduce the at least one frequency component can be emitted from the loudspeaker. The first noise can therefore be effectively reduced.

A projector according to a second aspect of the present disclosure includes an exterior enclosure having an intake port and a discharge port, a heat source disposed in the exterior enclosure, a first fan and a second fan that cause a cooling gas to flow to the heat source, a loudspeaker that is disposed between one of the two openings, the intake port and the discharge port, and one of the first and second fans, the one fan disposed in a position close to the one opening, in the channel of the cooling gas and outputs a sound wave according to a drive signal inputted to the loudspeaker, a first characteristic data storage section that stores frequency characteristic data on the frequency characteristics of first noise containing discrete frequency noise produced by the driven first fan, broadband noise based on the flow of the cooling gas generated by the driven first fan, and in-apparatus environmental noise in accordance with the rotational speed of the first fan per unit time, a second characteristic data storage section that stores frequency characteristic data on the frequency characteristics of second noise containing discrete frequency noise produced by the driven second fan, broadband noise based on the flow of the cooling gas generated by the driven second fan, and in-apparatus environmental noise in accordance with the rotational speed of the second fan per unit time, and a control section that generates the drive signal to be outputted to the loudspeaker.

The control section includes a characteristic acquisition section that acquires the frequency characteristic data representing the frequency characteristics of the first noise and corresponding to the rotational speed of the first fan per unit time from the first characteristic data storage section and acquires the frequency characteristic data representing the frequency characteristics of the second noise and corresponding to the rotational speed of the second fan per unit time from the second characteristic data storage section, a waveform generation section that generates the waveform of an interference sound that interferes with the first noise and the second noise leaking out of the exterior enclosure via the one opening based on the frequency characteristic data on the frequency characteristics of the first noise and the frequency characteristic data on the frequency characteristics of the second noise acquired by the characteristic acquisition section, and a signal output section that outputs the drive signal based on the waveform generated by the waveform generation section to the loudspeaker.

According to the configuration described above, the control section allows the loudspeaker to emit the interference sound, which interferes with the first noise and the second noise to reduce the first noise and the second noise, with no need for a microphone that detects the first noise and the second noise leaking out of the exterior enclosure via the one opening, as in the projector according to the first aspect described above.

Since the first noise and the second noise each include the discrete frequency noise, the broadband noise, and the in-apparatus environmental noise, the range of the noise reduced by emitting the interference sound can be expanded.

Therefore, the configuration of the projector can be simplified, and the first noise and the second noise can be effectively reduced.

In the second aspect described above, the projector includes a first rotational speed detection section that detects the rotational speed of the first fan per unit time, and a second rotational speed detection section that detects the rotational speed of the second fan per unit time.

The characteristic acquisition section may acquire from the first characteristic data storage section the frequency characteristic data representing the frequency characteristics of the first noise and corresponding to the rotational speed of the first fan per unit time detected by the first rotational speed detection section and acquire from the second characteristic data storage section the frequency characteristic data representing the frequency characteristics of the second noise and corresponding to the rotational speed of the second fan per unit time detected by the second rotational speed detection section.

According to the configuration described above, the characteristic acquisition section can acquire the frequency characteristic data representing the frequency characteristics of the first noise and according to the actual rotational speed of the first fan per unit time and the frequency characteristic data representing the frequency characteristics of the second noise and according to the actual rotational speed of the second fan per unit time.

Therefore, the waveform of the first noise and the waveform of the second noise can be reproduced more accurately, and in turn, the interference sound, which effectively interferes with the first noise and the second noise, can be emitted from the loudspeaker.

The first noise and the second noise emitted out of the projector can therefore be effectively reduced.

In the second aspect described above, the projector includes a first rotational position detection section that detects the rotational position of the first fan, a second rotational position detection section that detects the rotational position of the second fan, a first phase data storage section that stores first phase data representing the phases of a plurality of frequency components contained in the first noise in accordance with the rotational speed of the first fan per unit time and the rotational position of the first fan, and a second phase data storage section that stores second phase data representing the phases of a plurality of frequency components contained in the second noise in accordance with the rotational speed of the second fan per unit time and the rotational position of the second fan.

The control section may include a phase acquisition section that acquires from the first phase data storage section the first phase data corresponding to the rotational position of the first fan detected by the first rotational position detection section, and acquires from the second phase data storage section the second phase data corresponding to the rotational position of the second fan detected by the second rotational position detection section, and the waveform generation section may generate the waveform of the interference sound based on the frequency characteristic data on the frequency characteristics of the first noise and the frequency characteristic data on the frequency characteristics of the second noise acquired by the characteristic acquisition section and the first phase data and the second phase data acquired by the phase acquisition section.

According to the configuration described above, the phase acquisition section acquires the first phase data according to the rotational position of the first fan detected by the first rotational position detection section and the second phase data according to the rotational position of the second fan detected by the second rotational position detection section.

The configuration described above, in which the waveform generation section generates the waveform of the interference sound based on the frequency characteristic data on the frequency characteristics of the first noise and the frequency characteristic data on the frequency characteristics of the second noise acquired by the characteristic acquisition section and the first phase data and the second phase data acquired by the phase acquisition section, allows the interference sound, which can effectively reduce the first noise and the second noise, to be emitted from the loudspeaker, as in the projector according to the first aspect described above.

The first noise and the second noise can therefore be effectively reduced.

A projector according to a third aspect of the present disclosure includes an exterior enclosure having an intake port and a discharge port, a heat source disposed in the exterior enclosure, a first fan that causes a cooling gas to flow to one of the heat source, a second fan that has the same specifications as those of the first fan and causes the cooling gas to flow to the heat source, a loudspeaker that is disposed between one of the two openings, the intake port and the discharge port, and one of the first and second fans, the one fan disposed in a position close to the one opening, in the channel of the cooling gas and outputs a sound wave according to a drive signal inputted to the loudspeaker, a first characteristic data storage section that stores frequency characteristic data on the frequency characteristics of first noise containing discrete frequency noise produced by the driven first fan, broadband noise based on the flow of the cooling gas generated by the driven first fan, and in-apparatus environmental noise in accordance with the rotational speed of the first fan per unit time, a second characteristic data storage section that stores frequency characteristic data on the frequency characteristics of second noise containing discrete frequency noise produced by the driven second fan, broadband noise based on the flow of the cooling gas generated by the driven second fan, and in-apparatus environmental noise in accordance with the rotational speed of the second fan per unit time, and a control section that generates the drive signal to be outputted to the loudspeaker.

The control section includes a fan control section that drives the first and second fans at the same rotational speed per unit time, a characteristic acquisition section that acquires the frequency characteristic data representing the frequency characteristics of the first noise and corresponding to the rotational speed of the first fan per unit time from the first characteristic data storage section and acquires the frequency characteristic data representing the frequency characteristics of the second noise and corresponding to the rotational speed of the second fan per unit time from the second characteristic data storage section, a waveform generation section that generates the waveform of an interference sound that interferes with the first noise and the second noise leaking out of the exterior enclosure via the one opening based on the frequency characteristic data on the frequency characteristics of the first noise and the frequency characteristic data on the frequency characteristics of the second noise acquired by the characteristic acquisition section, and a signal output section that outputs the drive signal based on the waveform generated by the waveform generation section to the loudspeaker.

According to the configuration described above, the control section allows the loudspeaker to emit the interference sound, which interferes with the first noise and the second noise to reduce the first noise and the second noise, with no need for a microphone that detects the first noise and the second noise leaking out of the exterior enclosure via the one opening, as in the projectors according to the first and second aspects described above.

Since the first noise and the second noise each include the discrete frequency noise, the broadband noise, and the in-apparatus environmental noise, the range of the noise reduced by emitting the interference sound can be expanded.

Therefore, the configuration of the projector can be simplified, and the first noise and the second noise can be effectively reduced.

Furthermore, since the fan control section drives the first and second fans at the same rotational speed per unit time, there is no need to detect the rotational speeds of the first and second fans per unit time.

Therefore, the configuration of the projector can be simplified, and the interference sound outputting process can be simplified.

In the third aspect described above, the projector may include a rotational speed detection section that detects the rotational speed of one of the first and second fans per unit time, and the characteristic acquisition section may acquire the frequency characteristic data representing the frequency characteristics of the first noise and corresponding to the rotational speed detected by the rotational speed detection section and the frequency characteristic data representing the frequency characteristics of the second noise and corresponding to the rotational speed detected by the rotational speed detection section.

According to the configuration described above, since the first and second fans are driven at the same rotational speed per unit time, the actual rotational speeds of the first and second fans per unit time can be detected by the rotational speed detection section through detection of the rotational speed of one of the first and second fans per unit time. There is therefore no need to provide each of the first and second fans with the rotational speed detection section.

The characteristic acquisition section can acquire the frequency characteristic data representing the frequency characteristics of the first noise and according to the actual rotational speed of the first fan per unit time and the frequency characteristic data representing the frequency characteristics of the second noise and according to the actual rotational speed of the second fan per unit time.

Therefore, the waveform of the first noise and the waveform of the second noise can be reproduced more accurately, and the loudspeaker can in turn emit the interference sound, which effectively interferes with the first and second noise, whereby the first noise and the second noise emitted out of the projector can be effectively reduced, as in the projector according to the second aspect described above.

In the third aspect described above, the projector includes a rotational position detection section that detects the rotational position of one of the first and second fans, a first phase data storage section that stores first phase data representing the phases of a plurality of frequency components contained in the first noise in accordance with the rotational speed of the first fan per unit time and the rotational position of the first fan, and a second phase data storage section that stores second phase data representing the phases of a plurality of frequency components contained in the second noise in accordance with the rotational speed of the second fan per unit time and the rotational position of the second fan.

The fan control section may drive the first and second fans in synchronization with each other in such a way that the rotational position of the first fan coincides with the rotational position of the second fan, the control section may include a phase acquisition section that acquires from the first phase data storage section the first phase data corresponding to the rotational position of the one fan and acquires from the second phase data storage section the second phase data corresponding to the rotational position of the one fan, and the waveform generation section may generate the waveform of the interference sound based on the frequency characteristic data on the frequency characteristics of the first noise and the frequency characteristic data on the frequency characteristics of the second noise acquired by the characteristic acquisition section and the first phase data and the second phase data acquired by the phase acquisition section.

According to the configuration described above, the fan control section drives the first and second fans in synchronization with each other in such a way that the rotational position of the first fan coincides with the rotational position of the second fan. The rotational positions of the first and second fans can each be acquired by the rotational position detection section through detection of the rotational position of one of the first and second fans.

Therefore, the configuration of the projector can be simplified, and the interference sound outputting process can be simplified.

Thereafter, the phase acquisition section acquires the first phase data according to the rotational position of the first fan and the second phase data according to the rotational position of the second fan, and the waveform generation section generates the waveform of the interference sound based on the frequency characteristic data on the frequency characteristics of the first noise, the frequency characteristic data on the frequency characteristics of the second noise, the first phase data, and the second phase data.

The interference sound that can effectively reduce the first noise and the second noise can thus be emitted from the loudspeaker, as in the projector according to the second embodiment described above. The first noise and the second noise can therefore be effectively reduced.

In the second and third aspects described above, the frequency characteristic data on the frequency characteristics of the first noise may be data representing the features of at least one of the plurality of frequency components contained in the first noise, and the frequency characteristic data on the frequency characteristics of the second noise may be data representing the features of at least one of the plurality of frequency components contained in the second noise.

According to the configuration described above, the interference sound, which can effectively reduce at least one frequency component contained in the first noise and the second noise, can be emitted from the loudspeaker, as in the projector according to the first aspect described above.

The first noise and the second noise can therefore be effectively reduced.

In the second and third aspects described above, the heat source may include a first heat source and a second heat source, the first fan may cause the cooling gas to flow to the first heat source, and the second fan may cause the cooling gas to flow to the second heat source.

According to the configuration described above, in which the cooling gas flows to each of the first and second heat sources, the first and second heat sources can be cooled efficiently.

A cooling apparatus according to a fourth aspect of the present disclosure includes a fan that causes a cooling gas to flow to a heat source, a loudspeaker that outputs a sound wave according to a drive signal inputted to the loudspeaker, a characteristic data storage section that stores frequency characteristic data on the frequency characteristics of first noise containing discrete frequency noise produced by the driven fan, broadband noise based on the flow of the cooling gas generated by the driven fan, and environmental noise in accordance with the rotational speed of the fan per unit time, and a control section that generates the drive signal to be outputted to the loudspeaker.

The control section includes a characteristic acquisition section that acquires the frequency characteristic data corresponding to the rotational speed of the fan per unit time from the characteristic data storage section, a waveform generation section that generates the waveform of an interference sound that reduces the first noise based on the frequency characteristic data acquired by the characteristic acquisition section, and a signal output section that outputs the drive signal based on the waveform generated by the waveform generation section to the loudspeaker.

According to the configuration described above, the interference sound, which interferes with the first noise, can be emitted from the loudspeaker with no need for a microphone that detects the first noise, whereby the configuration of the projector can be simplified, and the range of reducible noise can be expanded, as in the projector according to the first aspect described above.

In the fourth aspect described above, the cooling apparatus may include a rotational speed detection section that detects the rotational speed of the fan per unit time, and the characteristic acquisition section may acquire the frequency characteristic data corresponding to the rotational speed of the fan per unit time detected by the rotational speed detection section.

According to the configuration described above, the characteristic acquisition section can acquire the frequency characteristic data corresponding to the actual rotational speed of the fan per unit time, can therefore more accurately reproduce the waveform of the first noise, and in turn allows the interference sound, which effectively interferes with the first noise, to emit from the loudspeaker, as in the projector according to the first aspect described above.

In the fourth aspect described above, the cooling apparatus includes a rotational position detection section that detects the rotational position of the fan, and a phase data storage section that stores phase data representing the phases of a plurality of frequency components contained in the first noise in accordance with the rotational speed of the fan per unit time and the rotational position of the fan.

The control section may include a phase acquisition section that acquires from the phase data storage section the phase data corresponding to the rotational position of the fan detected by the rotational position detection section, and the waveform generation section may generate the waveform of the interference sound based on the frequency characteristic data acquired by the characteristic acquisition section and the phase data acquired by the phase acquisition section.

The configuration described above, in which the waveform generation section generates the waveform of the interference sound based on the frequency characteristic data acquired by the characteristic acquisition section and the phase data acquired by the phase acquisition section, allows the interference sound, which can effectively reduce the first noise, to be emitted from the loudspeaker, as in the projector according to the first aspect described above.

In the fourth aspect described above, the frequency characteristic data described above may be data representing the features of at least one of the plurality of frequency components contained in the first noise described above.

According to the configuration described above, the interference sound, which can effectively reduce at least one frequency component contained in the first noise, can be emitted from the loudspeaker, whereby the first noise can be effectively reduced, as in the projectors according to the first aspect described above.

A cooling apparatus according to a fifth aspect of the present disclosure includes a first fan and a second fan that cause a cooling gas to flow to a heat source, a loudspeaker that outputs a sound wave according to a drive signal inputted to the loudspeaker, a first characteristic data storage section that stores frequency characteristic data on the frequency characteristics of first noise containing discrete frequency noise produced by the driven first fan, broadband noise based on the flow of the cooling gas generated by the driven first fan, and environmental noise in accordance with the rotational speed of the first fan per unit time, a second characteristic data storage section that stores frequency characteristic data on the frequency characteristics of second noise containing discrete frequency noise produced by the driven second fan, broadband noise based on the flow of the cooling gas generated by the driven second fan, and environmental noise in accordance with the rotational speed of the second fan per unit time, and a control section that generates the drive signal to be outputted to the loudspeaker.

The control section includes a characteristic acquisition section that acquires the frequency characteristic data representing the frequency characteristics of the first noise and corresponding to the rotational speed of the first fan per unit time from the first characteristic data storage section and acquires the frequency characteristic data representing the frequency characteristics of the second noise and corresponding to the rotational speed of the second fan per unit time from the second characteristic data storage section, a waveform generation section that generates the waveform of interference sound that interferes with the first noise and the second noise based on the frequency characteristic data on the frequency characteristics of the first noise and the frequency characteristic data on the frequency characteristics of the second noise acquired by the characteristic acquisition section, and a signal output section that outputs the drive signal based on the waveform generated by the waveform generation section to the loudspeaker.

According to the configuration described above, the control section allows the interference sound, which interferes with the first noise and the second noise, to be emitted from the loudspeaker with no need for a microphone that detects the first noise and the second noise, whereby the configuration of the projector can be simplified, as in the projector according to the second aspect described above.

In addition, since the first noise and the second noise each contain the discrete frequency noise, the broadband noise, and the in-apparatus environmental noise, the range of noise reduced by emitting the interference noise can be expanded.

In the fifth aspect described above, the cooling apparatus includes a first rotational speed detection section that detects the rotational speed of the first fan per unit time, and a second rotational speed detection section that detects the rotational speed of the second fan per unit time.

The characteristic acquisition section may acquire from the first characteristic data storage section the frequency characteristic data representing the frequency characteristics of the first noise and corresponding to the rotational speed of the first fan per unit time detected by the first rotational speed detection section and acquire from the second characteristic data storage section the frequency characteristic data representing the frequency characteristics of the second noise and corresponding to the rotational speed of the second fan per unit time detected by the second rotational speed detection section.

According to the configuration described above, the characteristic acquisition section can acquire the frequency characteristic data representing the frequency characteristics of the first noise and according to the actual rotational speed of the first fan per unit time and the frequency characteristic data representing the frequency characteristics of the second noise and according to the actual rotational speed of the second fan per unit time, whereby the first noise and the second noise can be effectively reduced, as in the projector according to the second aspect described above.

In the fifth aspect described above, the cooling apparatus includes a first rotational position detection section that detects the rotational position of the first fan, a second rotational position detection section that detects the rotational position of the second fan, a first phase data storage section that stores first phase data representing the phases of a plurality of frequency components contained in the first noise in accordance with the rotational speed of the first fan per unit time and the rotational position of the first fan, and a second phase data storage section that stores second phase data representing the phases of a plurality of frequency components contained in the second noise in accordance with the rotational speed of the second fan per unit time and the rotational position of the second fan.

The control section may include a phase acquisition section that acquires from the first phase data storage section the first phase data corresponding to the rotational position of the first fan detected by the first rotational position detection section, and acquires from the second phase data storage section the second phase data corresponding to the rotational position of the second fan detected by the second rotational position detection section, and the waveform generation section may generate the waveform of the interference sound based on the frequency characteristic data on the frequency characteristics of the first noise and the frequency characteristic data on the frequency characteristics of the second noise acquired by the characteristic acquisition section and the first phase data and the second phase data acquired by the phase acquisition section.

The configuration described above, in which the waveform generation section generates the waveform of the interference sound based on the frequency characteristic data on the frequency characteristics of the first noise and the frequency characteristic data on the frequency characteristics of the second noise acquired by the characteristic acquisition section and the first phase data and the second phase data acquired by the phase acquisition section, allows effective reduction in the first noise and the second noise, as in the projector according to the second aspect described above.

A cooling apparatus according to a sixth aspect of the present disclosure includes a first fan that causes a cooling gas to flow to a heat source, a second fan that has the same specifications as those of the first fan and causes the cooling gas to flow to the heat source, a loudspeaker that outputs a sound wave according to a drive signal inputted to the loudspeaker, a first characteristic data storage section that stores frequency characteristic data on the frequency characteristics of first noise containing discrete frequency noise produced by the driven first fan, broadband noise based on the flow of the cooling gas generated by the driven first fan, and environmental noise in accordance with the rotational speed of the first fan per unit time, a second characteristic data storage section that stores frequency characteristic data on the frequency characteristics of second noise containing discrete frequency noise produced by the driven second fan, broadband noise based on the flow of the cooling gas generated by the driven second fan, and environmental noise in accordance with the rotational speed of the second fan per unit time, and a control section that generates the drive signal to be outputted to the loudspeaker.

The control section includes a fan control section that drives the first and second fans at the same rotational speed per unit time, a characteristic acquisition section that acquires the frequency characteristic data representing the frequency characteristics of the first noise and corresponding to the rotational speed of the first fan per unit time from the first characteristic data storage section and acquires the frequency characteristic data representing the frequency characteristics of the second noise and corresponding to the rotational speed of the second fan per unit time from the second characteristic data storage section, a waveform generation section that generates the waveform of interference sound that interferes with the first noise and the second noise based on the frequency characteristic data on the frequency characteristics of the first noise and the frequency characteristic data on the frequency characteristics of the second noise acquired by the characteristic acquisition section, and a signal output section that outputs the drive signal based on the waveform generated by the waveform generation section to the loudspeaker.

According to the configuration described above, the control section allows the interference sound, which interferes with the first noise and the second noise, to be emitted from the loudspeaker with no need for a microphone that detects the first noise and the second noise, and can expand the range of the noise reduced by emitting the interference sound, as in the projector according to the third aspect described above.

Furthermore, since the fan control section drives the first and second fans at the same rotational speed per unit time, there is no need to detect the rotational speeds of the first and second fans per unit time.

Therefore, the configuration of the projector can be simplified, and the interference sound outputting process can be simplified.

In the sixth aspect described above, the cooling apparatus may include a rotational speed detection section that detects the rotational speed of one of the first and second fans per unit time, and the characteristic acquisition section may acquire the frequency characteristic data representing the frequency characteristics of the first noise and corresponding to the rotational speed detected by the rotational speed detection section and the frequency characteristic data representing the frequency characteristics of the second noise and corresponding to the rotational speed detected by the rotational speed detection section.

According to the configuration described above, the first and second fans do not each need to be provided with the rotational speed detection section, as in the projector according to the third aspect described above. In addition, the waveform of the first noise and the waveform of the second noise can be reproduced more accurately, and in turn, the interference sound, which effectively interferes with the first noise and the second noise, can be emitted from the loudspeaker.

In the sixth aspect described above, the cooling apparatus includes a rotational position detection section that detects the rotational position of one of the first and second fans, a first phase data storage section that stores first phase data representing the phases of a plurality of frequency components contained in the first noise in accordance with the rotational speed of the first fan per unit time and the rotational position of the first fan, and a second phase data storage section that stores second phase data representing the phases of a plurality of frequency components contained in the second noise in accordance with the rotational speed of the second fan per unit time and the rotational position of the second fan.

The fan control section may drive the first and second fans in synchronization with each other in such a way that the rotational position of the first fan coincides with the rotational position of the second fan, the control section may include a phase acquisition section that acquires from the first phase data storage section the first phase data corresponding to the rotational position of the one fan and acquires from the second phase data storage section the second phase data corresponding to the rotational position of the one fan, and the waveform generation section may generate the waveform of the interference sound based on the frequency characteristic data on the frequency characteristics of the first noise and the frequency characteristic data on the frequency characteristics of the second noise acquired by the characteristic acquisition section and the first phase data and the second phase data acquired by the phase acquisition section.

According to the configuration described above, the rotational position detection section can acquire the rotational positions of the first and second fans by detecting the rotational position of one of the first and second fans, whereby the configuration of the projector can be simplified, and the interference sound outputting process can be simplified, as in the projector according to third aspect described above.

The waveform generation section generates the waveform of the interference sound based on the frequency characteristic data on the frequency characteristics of the first noise, the frequency characteristic data on the frequency characteristics of the second noise, the first phase data, and the second phase data, whereby the interference sound, which can effectively reduce the first noise and the second noise, can be emitted from the loudspeaker.

In the fifth and sixth aspects described above, the frequency characteristic data on the frequency characteristics of the first noise may be data representing the features of at least one of the plurality of frequency components contained in the first noise, and the frequency characteristic data on the frequency characteristics of the second noise may be data representing the features of at least one of the plurality of frequency components contained in the second noise.

According to the configuration described above, the interference sound, which can effectively reduce at least one frequency component contained in the first noise and the second noise, can be emitted from the loudspeaker, as in the projectors according to the second and third aspects described above. The first noise and the second noise can therefore be effectively reduced.

In the fifth and sixth aspects described above, the heat source may include a first heat source and a second heat source, the first fan may cause the cooling gas to flow to the first heat source, and the second fan may cause the cooling gas to flow to the second heat source.

According to the configuration described above, the first and second heat sources can be cooled efficiently, as in the projectors according to the second and third aspects described above.

A control method according to a seventh aspect of the present disclosure is a control method executed by an electronic instrument including a fan that causes a cooling gas to flow to a heat source, and a loudspeaker that outputs a sound wave according to a drive signal inputted to the loudspeaker.

The method includes acquiring frequency characteristic data on the frequency characteristics of first noise containing discrete frequency noise produced by the driven fan, broadband noise based on the flow of the cooling gas generated by the driven fan, and in-apparatus environmental noise in accordance with the rotational speed of the fan per unit time, generating the waveform of interference sound that interferes with the first noise leaking out of the electronic instrument based on the acquired frequency characteristic data, and outputting the drive signal based on the generated waveform of the interference sound to the loudspeaker.

According to the configuration described above, the same effects as those provided by the projector according to the first aspect described above can be provided by executing the control method according to the seventh aspect described above.

A control method according to an eighth aspect of the present disclosure is a control method executed by an electronic instrument including a first fan and a second fan that cause a cooling gas to flow to a heat source, and a loudspeaker that outputs a sound wave according to a drive signal inputted to the loudspeaker.

The method includes acquiring frequency characteristic data on the frequency characteristics of first noise containing discrete frequency noise produced by the driven first fan, broadband noise based on the flow of the cooling gas generated by the driven first fan, and in-apparatus environmental noise in accordance with the rotational speed of the first fan per unit time, acquiring frequency characteristic data on the frequency characteristics of second noise containing discrete frequency noise produced by the driven second fan, broadband noise based on the flow of the cooling gas generated by the driven second fan, and in-apparatus environmental noise in accordance with the rotational speed of the second fan per unit time, generating the waveform of interference sound that interferes with the first noise and the second noise based on the acquired frequency characteristic data on the frequency characteristics of the first noise and the acquired frequency characteristic data on the frequency characteristics of the second noise, and outputting the drive signal based on the generated waveform of the interference sound to the loudspeaker.

According to the configuration described above, the same effects as those provided by the projector according to the second aspect described above can be provided by executing the control method according to the eighth aspect described above.

A control method according to a ninth aspect of the present disclosure is a control method executed by an electronic instrument including a first fan that causes a cooling gas to flow to a heat source, a second fan that has the same specifications as those of the first fan and causes the cooling gas to flow to the heat source, and a loudspeaker that outputs a sound wave according to a drive signal inputted to the loudspeaker.

The method includes driving the first and second fans at the same rotational speed per unit time, acquiring frequency characteristic data on the frequency characteristics of first noise containing discrete frequency noise produced by the driven first fan, broadband noise based on the flow of the cooling gas generated by the driven first fan, and in-apparatus environmental noise in accordance with the rotational speed of the first fan per unit time, acquiring frequency characteristic data on the frequency characteristics of second noise containing discrete frequency noise produced by the driven second fan, broadband noise based on the flow of the cooling gas generated by the driven second fan, and in-apparatus environmental noise in accordance with the rotational speed of the second fan per unit time, generating the waveform of interference sound that interferes with the first noise and the second noise based on the acquired frequency characteristic data on the frequency characteristics of the first noise and the acquired frequency characteristic data on the frequency characteristics of the second noise, and outputting the drive signal based on the generated waveform of the interference sound to the loudspeaker.

According to the configuration described above, the same effects as those provided by the projector according to the third aspect described above can be provided by executing the control method according to the ninth aspect described above.

What is claimed is:

1. A projector comprising:
an exterior enclosure having an intake port and a discharge port;
a heat source disposed in the exterior enclosure;
a fan that causes a cooling gas to flow to the heat source;
a loudspeaker that is disposed between one of two openings, the intake port and the discharge port, and the fan in a channel of the cooling gas and outputs a sound wave according to a drive signal inputted to the loudspeaker;
a characteristic data storage section that stores frequency characteristic data on frequency characteristics of first noise containing discrete frequency noise produced by the driven fan, broadband noise based on a flow of the cooling gas generated by the driven fan, and in-apparatus environmental noise in accordance with a rotational speed of the fan per unit time; and
a control section that generates the drive signal to be outputted to the loudspeaker,
wherein the control section includes
a characteristic acquisition section that acquires the frequency characteristic data corresponding to the rotational speed of the fan per unit time from the characteristic data storage section,
a waveform generation section that generates a waveform of an interference sound that interferes with the first noise leaking out of the exterior enclosure via the one opening based on the frequency characteristic data acquired by the characteristic acquisition section, and
a signal output section that outputs the drive signal based on the waveform generated by the waveform generation section to the loudspeaker.

2. The projector according to claim 1,
further comprising a rotational speed detection section that detects the rotational speed of the fan per unit time,
wherein the characteristic acquisition section acquires the frequency characteristic data corresponding to the rotational speed of the fan per unit time detected by the rotational speed detection section.

3. The projector according to claim 2, further comprising:
a rotational position detection section that detects a rotational position of the fan; and
a phase data storage section that stores phase data representing phases of a plurality of frequency components contained in the first noise in accordance with the rotational speed of the fan per unit time and the rotational position of the fan,
wherein the control section includes a phase acquisition section that acquires from the phase data storage section the phase data corresponding to the rotational position of the fan detected by the rotational position detection section, and
the waveform generation section generates the waveform of the interference sound based on the frequency characteristic data acquired by the characteristic acquisition section and the phase data acquired by the phase acquisition section.

4. The projector according to claim 1,
wherein the frequency characteristic data is data representing features of at least one of the plurality of frequency components contained in the first noise.

5. The projector according to claim 1,
wherein the fan includes a first fan and a second fan, and
the loudspeaker is disposed between one of the two openings, the intake port and the discharge port, and one of the first and second fans, the one fan disposed in a position close to the one opening, in the channel of the cooling gas, the characteristic data storage section includes
a first characteristic data storage section that stores frequency characteristic data on frequency characteristics of first noise containing discrete frequency noise produced by the driven first fan, broadband noise based on a flow of the cooling gas generated by the driven first fan, and in-apparatus environmental noise in accordance with a rotational speed of the first fan per unit time, and
a second characteristic data storage section that stores frequency characteristic data on frequency characteristics of second noise containing discrete frequency noise produced by the driven second fan, broadband noise based on a flow of the cooling gas generated by the driven second fan, and in-apparatus environmental noise in accordance with a rotational speed of the second fan per unit time,
the characteristic acquisition section acquires the frequency characteristic data representing the frequency characteristics of the first noise and corresponding to the rotational speed of the first fan per unit time from the first characteristic data storage section and acquires the frequency characteristic data representing the frequency characteristics of the second noise and corresponding to the rotational speed of the second fan per unit time from the second characteristic data storage section, and
the waveform generation section generates a waveform of an interference sound that interferes with the first noise and the second noise leaking out of the exterior enclosure via the one opening based on the frequency characteristic data on the frequency characteristics of the first noise and the frequency characteristic data on the frequency characteristics of the second noise acquired by the characteristic acquisition section.

6. The projector according to claim 5, further comprising:
a first rotational speed detection section that detects a rotational speed of the first fan per unit time; and
a second rotational speed detection section that detects the rotational speed of the second fan per unit time; and
wherein the characteristic acquisition section acquires from the first characteristic data storage section the frequency characteristic data representing the frequency characteristics of the first noise and corresponding to the rotational speed of the first fan per unit time detected by the first rotational speed detection section and acquires from the second characteristic data storage section the frequency characteristic data representing the frequency characteristics of the second noise and corresponding to the rotational speed of the second fan per unit time detected by the second rotational speed detection section.

7. The projector according to claim 6, further comprising:
a first rotational position detection section that detects a rotational position of the first fan;
a second rotational position detection section that detects a rotational position of the second fan;
a first phase data storage section that stores first phase data representing phases of a plurality of frequency components contained in the first noise in accordance with the rotational speed of the first fan per unit time and the rotational position of the first fan; and
a second phase data storage section that stores second phase data representing phases of a plurality of frequency components contained in the second noise in accordance with the rotational speed of the second fan per unit time and the rotational position of the second fan,
wherein the control section includes a phase acquisition section that acquires from the first phase data storage section the first phase data corresponding to the rotational position of the first fan detected by the first rotational position detection section, and acquires from the second phase data storage section the second phase data corresponding to the rotational position of the second fan detected by the second rotational position detection section, and
the waveform generation section generates the waveform of the interference sound based on the frequency characteristic data on the frequency characteristics of the first noise and the frequency characteristic data on the frequency characteristics of the second noise acquired by the characteristic acquisition section and the first phase data and the second phase data acquired by the phase acquisition section.

8. The projector according to claim 5,
wherein the second fan and the first fan have the same specifications, and
the control section includes a fan control section that drives the first and second fans at a same rotational speed per unit time.

9. The projector according to claim 8,
further comprising a rotational speed detection section that detects the rotational speed of one of the first and second fans per unit time,
wherein the characteristic acquisition section acquires the frequency characteristic data representing the frequency characteristics of the first noise and corresponding to the rotational speed detected by the rotational speed detection section and the frequency characteristic data representing the frequency characteristics of the second noise and corresponding to the rotational speed detected by the rotational speed detection section.

10. The projector according to claim 9, further comprising:
a rotational position detection section that detects a rotational position of one of the first and second fans;
a first phase data storage section that stores first phase data representing phases of a plurality of frequency components contained in the first noise in accordance with the rotational speed of the first fan per unit time and the rotational position of the first fan; and
a second phase data storage section that stores second phase data representing phases of a plurality of frequency components contained in the second noise in accordance with the rotational speed of the second fan per unit time and the rotational position of the second fan,
wherein the fan control section drives the first and second fans in synchronization with each other in such a way that the rotational position of the first fan coincides with the rotational position of the second fan,
the control section includes a phase acquisition section that acquires from the first phase data storage section the first phase data corresponding to the rotational position of the one fan and acquires from the second phase data storage section the second phase data corresponding to the rotational position of the one fan, and
the waveform generation section generates the waveform of the interference sound based on the frequency characteristic data on the frequency characteristics of the first noise and the frequency characteristic data on the frequency characteristics of the second noise acquired by the characteristic acquisition section and the first phase data and the second phase data acquired by the phase acquisition section.

11. The projector according to claim 5,
wherein the frequency characteristic data on the frequency characteristics of the first noise is data representing features of at least one of the plurality of frequency components contained in the first noise, and
the frequency characteristic data on the frequency characteristics of the second noise is data representing features of at least one of the plurality of frequency components contained in the second noise.

12. The projector according to claim 5,
wherein the heat source includes a first heat source and a second heat source,
the first fan causes the cooling gas to flow to the first heat source, and
the second fan causes the cooling gas to flow to the second heat source.

13. A cooling apparatus comprising:
a fan that causes a cooling gas to flow to a heat source;
a loudspeaker that outputs a sound wave according to a drive signal inputted to the loudspeaker;
a characteristic data storage section that stores frequency characteristic data on frequency characteristics of first noise containing discrete frequency noise produced by the driven fan, broadband noise based on a flow of the cooling gas generated by the driven fan, and environmental noise in accordance with a rotational speed of the fan per unit time; and
a control section that generates the drive signal to be outputted to the loudspeaker,
wherein the control section includes
a characteristic acquisition section that acquires the frequency characteristic data corresponding to the rotational speed of the fan per unit time from the characteristic data storage section,
a waveform generation section that generates a waveform of an interference sound that reduces the first noise based on the frequency characteristic data acquired by the characteristic acquisition section, and
a signal output section that outputs the drive signal based on the waveform generated by the waveform generation section to the loudspeaker.

14. The cooling apparatus according to claim 13,
further comprising a rotational speed detection section that detects the rotational speed of the fan per unit time,
wherein the characteristic acquisition section acquires the frequency characteristic data corresponding to the rotational speed of the fan per unit time detected by the rotational speed detection section.

15. The cooling apparatus according to claim 14, further comprising:
a rotational position detection section that detects a rotational position of the fan; and
a phase data storage section that stores phase data representing phases of a plurality of frequency components contained in the first noise in accordance with the rotational speed of the fan per unit time and the rotational position of the fan, wherein the control section includes a phase acquisition section that acquires from the phase data storage section the phase data corresponding to the rotational position of the fan detected by the rotational position detection section, and
the waveform generation section generates the waveform of the interference sound based on the frequency characteristic data acquired by the characteristic acquisition section and the phase data acquired by the phase acquisition section.

16. The cooling apparatus according to claim 13,
wherein the frequency characteristic data is data representing features of at least one of the plurality of frequency components contained in the first noise.

17. A control method executed by an electronic instrument including a fan that causes a cooling gas to flow to a heat source and a loudspeaker that outputs a sound wave according to a drive signal inputted to the loudspeaker, the method comprising:
acquiring frequency characteristic data on frequency characteristics of first noise containing discrete frequency noise produced by the driven fan, broadband noise based on a flow of the cooling gas generated by the driven fan, and in-apparatus environmental noise in accordance with a rotational speed of the fan per unit time;
generating a waveform of interference sound that interferes with the first noise leaking out of the electronic instrument based on the acquired frequency characteristic data; and
outputting the drive signal based on the generated waveform of the interference sound to the loudspeaker.

18. The control method according to claim 17,
wherein the fan includes a first fan and a second fan, and the method comprising:
acquiring frequency characteristic data on frequency characteristics of first noise containing discrete frequency noise produced by the driven first fan, broadband noise based on a flow of the cooling gas generated by the driven first fan, and in-apparatus environmental noise in accordance with a rotational speed of the first fan per unit time;
acquiring frequency characteristic data on frequency characteristics of second noise containing discrete frequency noise produced by the driven second fan, broadband noise based on a flow of the cooling gas generated by the driven second fan, and in-apparatus environmental noise in accordance with a rotational speed of the second fan per unit time; and
generating a waveform of interference sound that interferes with the first noise and the second noise based on the acquired frequency characteristic data on the frequency characteristics of the first noise and the acquired frequency characteristic data on the frequency characteristics of the second noise.

19. The control method according to claim 18,
wherein the second fan and the first fan have the same specifications, and
the method comprising driving the first and second fans at a same rotational speed per unit time.

* * * * *